(12) United States Patent  
Figueroa et al.

(10) Patent No.: US 8,068,351 B2  
(45) Date of Patent: Nov. 29, 2011

(54) CABLE MANAGEMENT SYSTEM

(75) Inventors: Gilberto Figueroa, Modesto, CA (US); Hon Hung Yam, San Jose, CA (US); Daniel Hruska, San Carlos, CA (US); Michael S. White, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 885 days.

(21) Appl. No.: 11/933,973

(22) Filed: Nov. 1, 2007

(65) Prior Publication Data

US 2008/0112152 A1    May 15, 2008

Related U.S. Application Data

(60) Provisional application No. 60/945,778, filed on Jun. 22, 2007, provisional application No. 60/858,180, filed on Nov. 10, 2006.

(51) Int. Cl.  
*H02B 1/20* (2006.01)

(52) U.S. Cl. ......... 361/826; 361/825; 361/827; 361/788

(58) Field of Classification Search ................... 361/825, 361/826, 827, 788  
See application file for complete search history.

(56) References Cited

U.S. PATENT DOCUMENTS

| | | | | |
|---|---|---|---|---|
| 4,703,394 A | * | 10/1987 | Petit et al. | 361/790 |
| 6,363,198 B1 | * | 3/2002 | Braga et al. | 385/134 |
| 7,140,911 B1 | * | 11/2006 | Rector et al. | 439/540.1 |
| 2003/0188880 A1 | * | 10/2003 | McClellan et al. | 174/48 |
| 2004/0228634 A1 | * | 11/2004 | Fricker | 398/135 |
| 2005/0067358 A1 | * | 3/2005 | Lee et al. | 211/26 |

* cited by examiner

*Primary Examiner* — Yuriy Semenenko  
*Assistant Examiner* — Andargie M Aychillhum  
(74) *Attorney, Agent, or Firm* — Park, Vaughan, Fleming & Dowler LLP

(57) ABSTRACT

A cable management system provides cable management for a switch chassis configured to receive a plurality of line card units. The cable management system comprises a cable guide arrangement configured to guide each of a plurality of cables from a line card such that the cables extend out from the line card unit and lie substantially within a plane.

15 Claims, 31 Drawing Sheets

FIG. 1

CABLE MANAGEMENT SYSTEM

RELATED APPLICATION

This application hereby claims priority under 35 U.S.C. §119 to U.S. Provisional Patent Application No. 60/858,180 filed 10 Nov. 2006, entitled "Switch Chassis," by inventors Ola Torudbakken, Andreas Bechtolsheim, Gilbert Figueroa, Hon Hung Yam. This application hereby claims priority under 35 U.S.C. §119 to U.S. Provisional Patent Application No. 60/945,778 filed 22 Jun. 2007, entitled "Communication Systems," by inventors Bjorn D. Johnsen, Ola Torudbakken, Inge Birkeli, Andreas Bechtolsheim, Hans Opheim, Gilberto Figuroa, Daniel Hruska, Hon Hung T Yam, and Michels S. White.

BACKGROUND

The invention relates to a cable management system, for example for use with a communications system such as a communications switch.

In a modern communications system, for example in a modern switch system, cable management can become a significant problem, due to a potentially large number of cables to be managed that exit communications equipment. Potential concerns relate to maintaining a proper bend radius for cables and good airflow for the communications equipment, which still permitting access to and maintenance of the communications equipment.

An example embodiment of the invention seeks to mitigate address at least some of these concerns.

SUMMARY

Various invention aspects are set out in the accompanying claims. Other invention aspects are described herein. The invention aspects have been made, at least in part, in consideration of problems and drawbacks of conventional systems.

An embodiment of the invention can provide a cable management system for a switch chassis configured to receive a plurality of line card units, each line card unit including at least one row of line connectors along a first edge of the line card unit, each line connector being configured to receive a cable connector of a cable, the cable management system comprising a cable guide arrangement configured to guide each of a plurality of cables such that, when the respective cable connectors thereof are connected to the line connectors of the at least one row of line connectors, the cables extend out from the first edge of the line card unit and then curve back, whereby the cables can pass at least part way along at least one side of the line card unit, the cable guide arrangement being configured such that said plurality of cables lie substantially within a plane parallel to said at least one row of line connectors as the cables extend out from the first edge and curve back.

An example embodiment can provide a cable management solution for a switch that has a large number of cables exiting the system. While maintaining the proper manufacturer's bend radius, good airflow can be provided, which permitting single line card extraction and flexible cable trunk orientation.

A switch comprising a switch chassis can be provided with such a cable management system.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Specific embodiments are described by way of example only with reference to the accompanying drawings.

FIG. 1 is a schematic representation of the rear of an example switch chassis.

Figure 2:
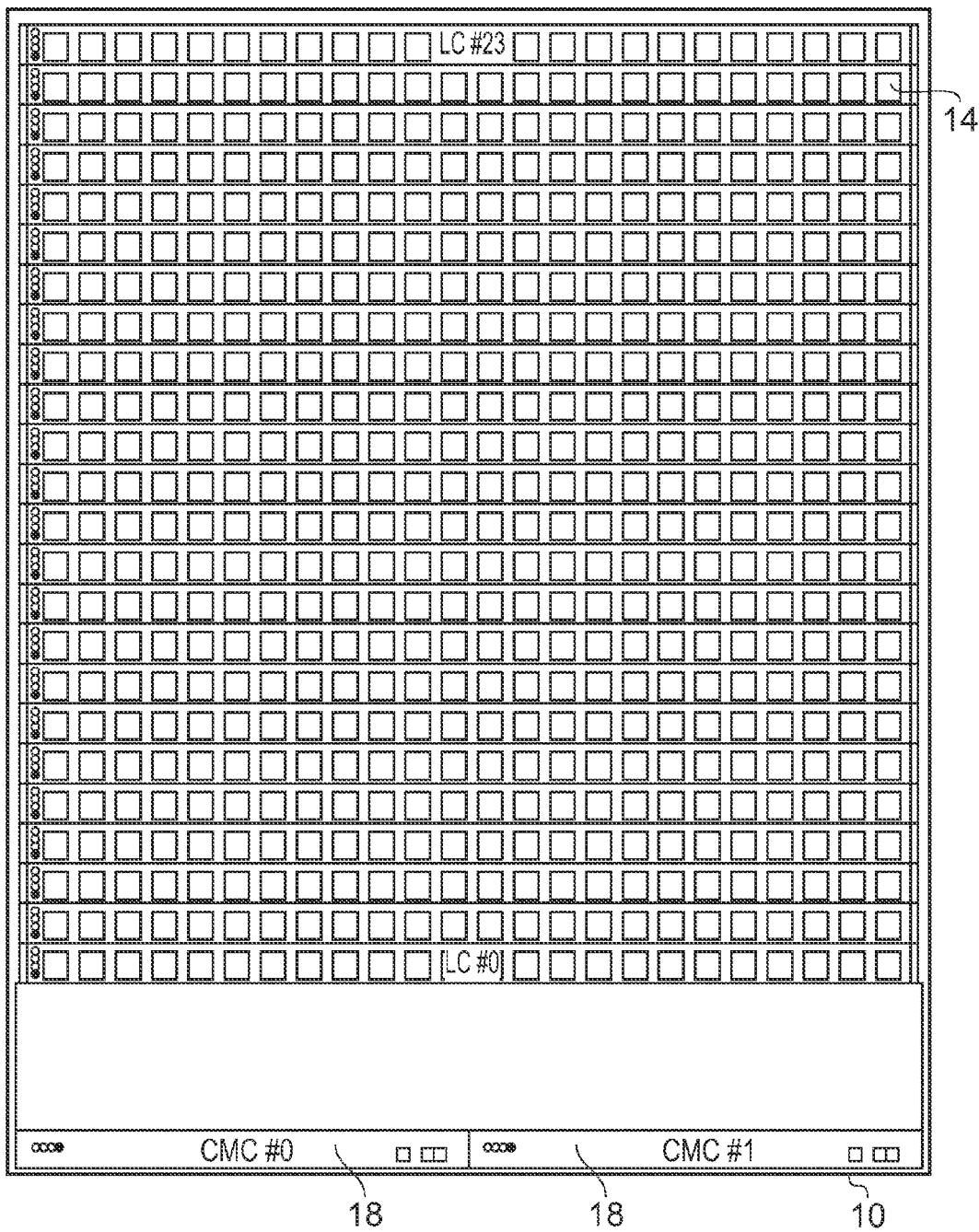
FIG. 2 is a schematic representation of the front of the example switch chassis.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention.

DETAILED DESCRIPTION

An example embodiment of a 3456-port InfiniBand 4xDDR switch in a custom rack chassis is described, with the switch architecture being based upon a 5-stage CLOS fabric. The rack chassis can form a switch enclosure.

The CLOS network, first described by Charles Clos in 1954, is a multi-stage fabric built from smaller individual switch elements that provides full-bisectional bandwidth for all end points, assuming effective dispersive routing.

Given that an external connection (copper or fiber) costs several times more per port than the silicon cost, the key to make large CLOS networks practical is to minimize the number of external cables required and to maximize the number of internal interconnections. This reduces the cost and increases the reliability. For example, a 5-stage fabric constructed with switching elements of size (n) ports supports $(n*n/2*n/2)$ edge points, using $(5*n/2*n2)$ switch elements with a total of $(3*n*n/2*n/2)$ connections. The ratio of total to external connections is 5:1, i.e. 80% of all connections can be kept internal. The switch elements (switch chips) in the described example can be implemented using a device with 24 4xDDR ports.

An example switch uses a connector that support 3 4x ports per connector, which can further to minimize a number of cables needed. This can provides a further 3:1 reduction in the number of cables. In a described example, only 1152 cables $(\frac{1}{3}*n*n/2*n/2)$ are required.

In contrast if prior commercially available 288-port switches and 24-port switches were used to create a 3456-port fabric a total of 6912 cables $(2*n*n/2*n/2)$ would be required.

The example switch can provide a single chassis that can implement a 5-stage CLOS fabric with 3456 4xDDR ports. High density external interfaces can be provided, including fiber, shielded copper, fiber and twisted pair copper. The amount of cabling can be reduced by 84.4% when compared to building a 3456-port fabric with commercially available 24-port and 288-port switches. In the example embodiment, an orthogonal midplane design can be provided that is capable of DDR data rates.

An example switch can address a full range of HPC cluster computing from a few hundred to many thousand of nodes with a reliable and cost-effective solution that uses fewer chassis and cables than prior solutions.

Figure 1:
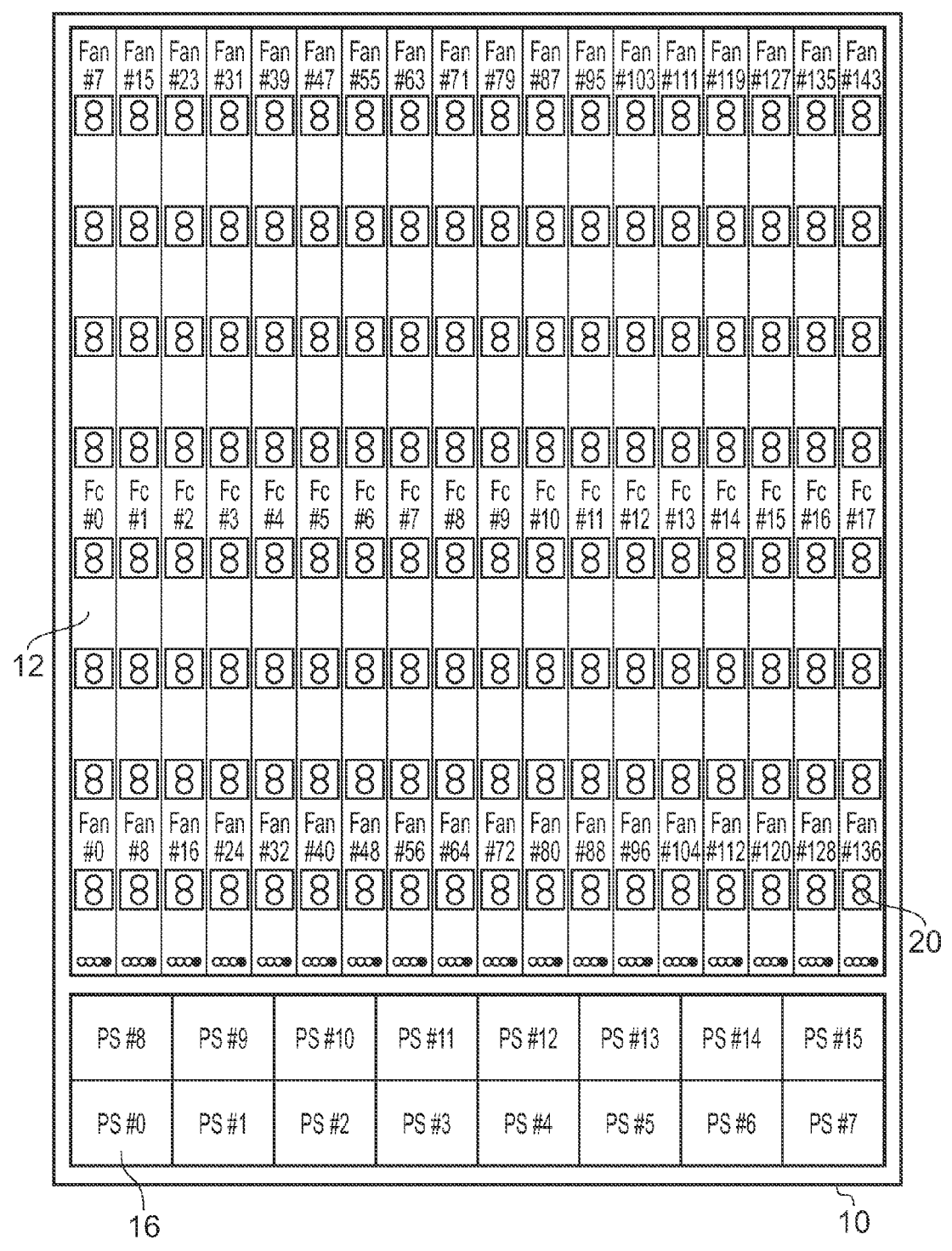

FIGS. 1 and 2 are schematic diagrams of an example of a switch chassis as viewed from the rear (FIG. 1) and front (FIG. 2), respectively. This example comprises a custom rack chassis 10 that is 60" high, 47" wide, and 36" deep, not including a cable management system. The example embodiment provides a passive orthogonal midplane design (not shown in FIGS. 1 and 2) that provides a direct interface between Line Cards (LC) 12 and Fabric Cards (FC) 14. The line cards provide connections to external lines and the fabric card form switch fabric cards for providing switching functions.

In the present example, up to 18 fabric cards (FC0 to FC17) 12, FIG. 1 are provided. Each fabric card 12 plugs vertically into the midplane from the rear.

In the present example, up to 24 line cards (LC0 to LC23) 14, FIG. 2 can be provided. Each line card provides 144 4x ports (24 stacked 168-circuit cable connectors). Each line card plugs horizontally into the midplane from the front.

Up to 16 hot-pluggable power supply units (PS0-PS16) 16, FIG. 1 are each plugged into the chassis 10 from the rear. Each power supply unit 16 has an alternating current (AC) power supply inlet (not shown). The power supply units 16 plug into a power distribution board (PDB), which is not shown in FIGS. 1 and 2. Two busbars (not shown in FIGS. 1 and 2), one per group of 8 power supply units, distribute direct current (DC) supply to the line cards 12 and the fabric cards 14.

Two hot-pluggable Chassis Management Controllers (CMCs) 18, FIG. 2 plug into the power distribution board from the front. Each chassis management controller 18 comprises a mezzanine card.

The power distribution board is a passive power distribution board that supports up to 16 power supply units DC connectors and 2 chassis management controller slot connectors. The power distribution board connects to the midplane through ribbon cables that carry low-speed signals.

In the present example, up to 144 fan modules (Fan#0-Fan#143) 20 are provided, with 8 fan modules per fabric card 12 in the present instance. Cooling airflow in controlled to be from the front to the rear, using redundant fans on the fabric cards to pull the air from the line cards 14 through openings (not shown in FIGS. 1 and 2), in the midplane. The power supply units 16 have their own fans for cooling with the air exiting through the rear of the chassis. The power supply units 18 are also used to cool the chassis management controllers 18.

Figure 3:
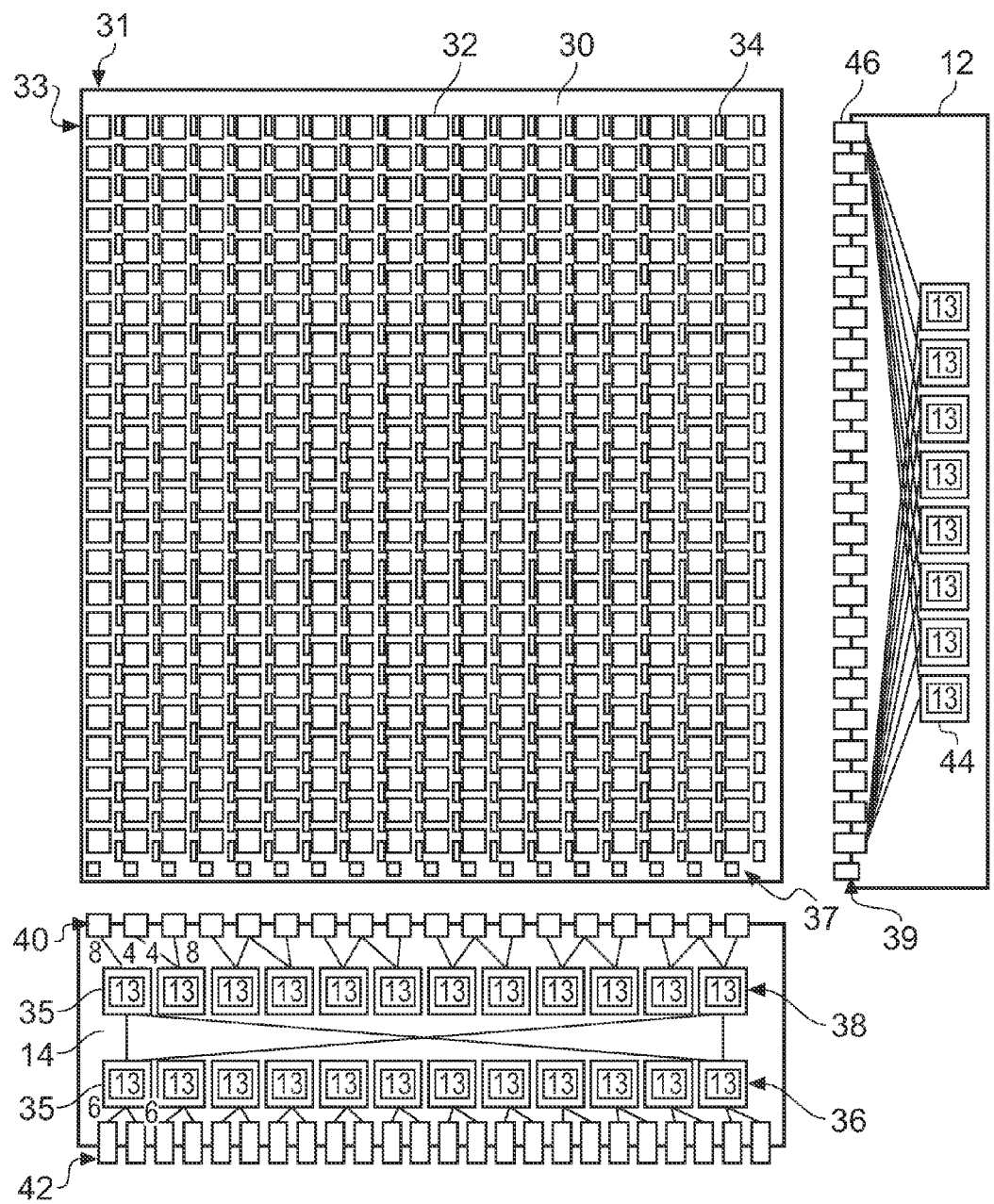
FIG. 3 is a schematic representation of a midplane illustrating the logical connectivity through the midplane between cards at the rear and cards at the front orientated orthogonally with respect to each other.

FIG. 3 is a schematic representation of a printed circuit board 30, which is configured as a midplane 30 in the switch chassis 10. The midplane 30 is configured in an orthogonal manner such that each fabric card 12 can connect to each of the line cards 14 without requiring any signal traces on the midplane 30. The orthogonal midplane design can provide excellent signal integrity in excess of 10 Gbps per differential pair.

The midplane 30 is represented schematically to show an array of midplane connector pairs 32 as black squares with ventilation openings shown as white rectangles. Each midplane connector pair 32 comprises a pair of connectors (to be explained in more detail later) with one connector on a first face of the midplane and a second connector on the other face of the midplane, the first and second connectors being electrically interconnected by way of pass-through vias (not shown in FIG. 3) formed in the midplane 30. As will be explained later, the first and second connectors of a midplane connector pair 32 are each multipath connectors. They are arranged orthogonally with respect to one another such that a first midplane connector of a midplane connector pair 32 is connectable to a fabric card 12 on a first side of the plane 30 in a first orientation and a second midplane connector of the midplane connector pair 32 is connectable to a line card on a second side of the plane 30 in a second orientation substantially orthogonally to the first orientation.

In an example described herein, each of the first connectors of the respective midplane connector pairs 32 of a column 31 of midplane connector pairs 32 can be connected to one fabric card 12. This can be repeated column by column for successive fabric cards 12. In an example described herein, each of the second connectors of the respective midplane connector pairs 32 of a row 33 of midplane connector pairs 32 can be connected to one line card 14. This can be repeated row by row for successive line cards 14. As a result, the midplane can be populated by vertically oriented fabric cards 12 on the first side of the midplane and horizontally orientated line cards 12 on the second side of the midplane 30.

In the present example the midplane 30 provides orthogonal connectivity between fabric cards 12 and the line cards 14 using orthogonal connector pairs. Each orthogonal connector pair provides 64 differential signal pairs, which is sufficient to carry the high-speed signals needed as well as a number of low-speed signals. The orthogonal connector pairs are not shown in FIG. 3, but are described later.

The midplane 30 is also configured to provide 3.3VDC standby power distribution to all cards and to provide I2C/System Management Bus connections for all fabric cards 12 and line cards 14.

Another function of the midplane 30 is to provide thermal openings for a front-to-rear airflow. The white holes in FIG. 3 (e.g., hole 34) form openings 34 in the midplane for airflow. In this example the midplane is approximately 50% open for airflow.

The fabric cards 12 each support 24 connectors and the line cards 14 each support 18 connectors.

FIG. 3 also illustrates an example of how the fabric cards 12, the midplane 20 and the line cards 14 interconnect. In this example there are 24 switch chips on a line card 14 and 8 chips on each of the 18 fabric cards 12.

As previously mentioned a 5-stage Clos fabric has a size n*n/2*n/2 in which n is the size of the switch element. The example switch element in FIG. 3 has n equal to 24 ports. Each line card 14 has 24 chips in 2 rows with 12 chips in each row. Each of 12 ports of each switch chip 35 in a first row 36 of the line card 14 is connected to 2 cable connectors 42, with 6 ports per cable connector. There are a total of 24 cable connectors per line card 14. Each cable connector can accommodate two physical independent cables that each carries 3 ports (links). Each cable connector 42 can accommodate 6 ports. The remaining 12 ports of each switch chip 35 in the first row 26 is connected to one chip 35 each in a second row 38 of chips 35.

There are 18 midplane connectors 32 per line card 14. Each midplane connector 32 provides one physical connection to one fabric card 14. Each midplane connector 32 can accommodate 8 4x links (there are 8 differential pairs per 4x link and a total of 64 differential pairs provided by the orthogonal connector)

12 ports of each of the switch chips 35 in the second row 38 of the line card 14 are connected to 2 line card connectors 40 that are used to connect the line card 14 to the midplane connectors 32 and thereby with the fabric cards 12 through the orthogonally oriented midplane connector pair. Of the 12 ports per switch chip 35, eight ports are connected to one line card connector 40, and the remaining four ports are connected to another line card connector 40 as represented by the numbers 8 and 4 adjacent the two left hand switch chips 35 in the second row 38. 2 switch chips are thereby connected to a group of 3 line card connectors 40 and hence to a group of three midplane connectors pairs 32.

The remaining 12 ports of each switch chip 35 in the second row 38 of the line card 14 are connected to each of the 12 switch chips 35 in the first row 36 of the line card 14.

At the fabric card 12 all links through an orthogonally oriented midplane connector pair 32 are connected to one line card 14. A single orthogonal connector 46 carries 8 links. These links are connected to one switch element 44 each at the fabric card 12.

Also shown in FIG. 3 are power connectors 37 on the midplane and power connectors 39 on the fabric cards 12.

There has been described a system with 24 line cards with 144 ports each, realized through 48 physical cable connectors that each carry 3 links. The switch fabric structure of each line card 14 is fully connected, so the line card 14 itself can be viewed upon as a fully non-blocking 144 port switch. In addition each line card 14 has 144 links that are connected to 18 fabric cards. The 18 fabric cards then connect all the line cards 14 together in a 5-stage non-blocking Clos topology.

Figure 4A:
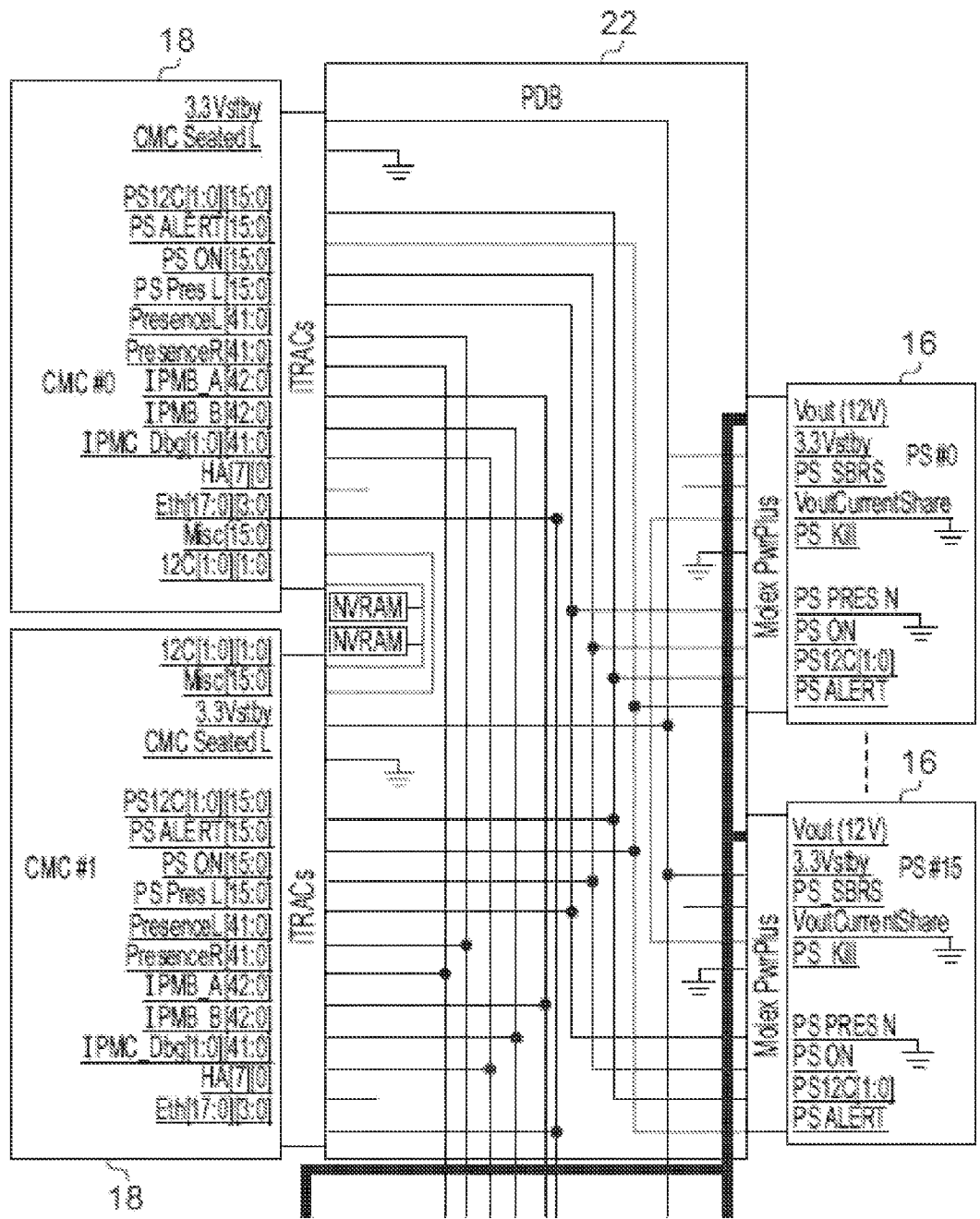
FIG. 4A is a schematic diagram of an example management infrastructure.
Figure 4B:
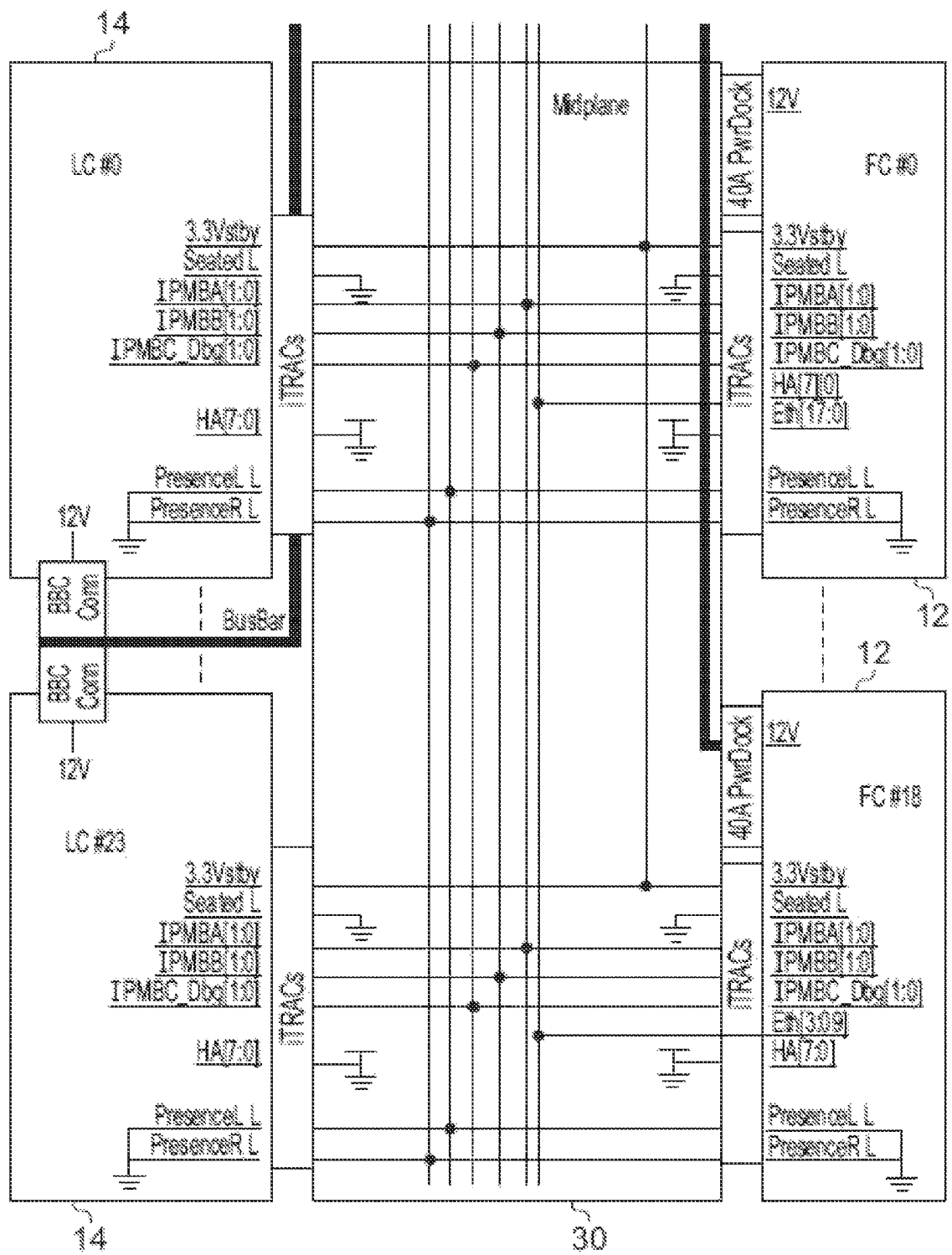
FIG. 4B continues the schematic diagram illustrated in FIG. 4A.

FIGS. 4A and 4B are schematic diagrams of an example management infrastructure. This example provides redundant chassis management controllers 18. In addition each fabric card 12 and line card 14 supports an management controller. There are redundant management connections from each chassis management controller 18 to each of the fabric card and line card management controllers. In addition there are I2C connections to each of the power supply units 16. The management connections pass between the fabric cards 12, the line cards 14, the power supply units 16 and the chassis management cards 18 via the midplane and the power distribution board 22 in the present example.

FIGS. 5 to 11 provide various schematic views of an example of a switch chassis in accordance with the invention.

Figure 5:
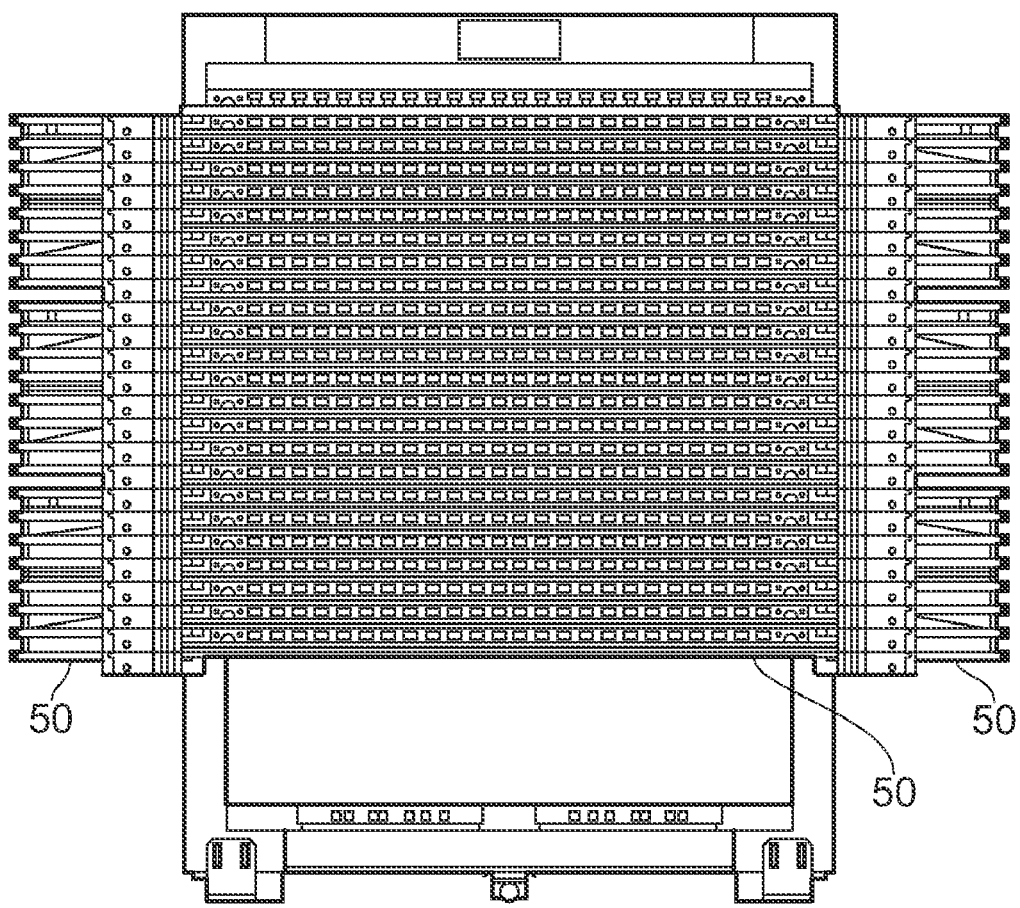
FIGS. 5 to 11 are views of an example of a switch chassis.
Figure 6:
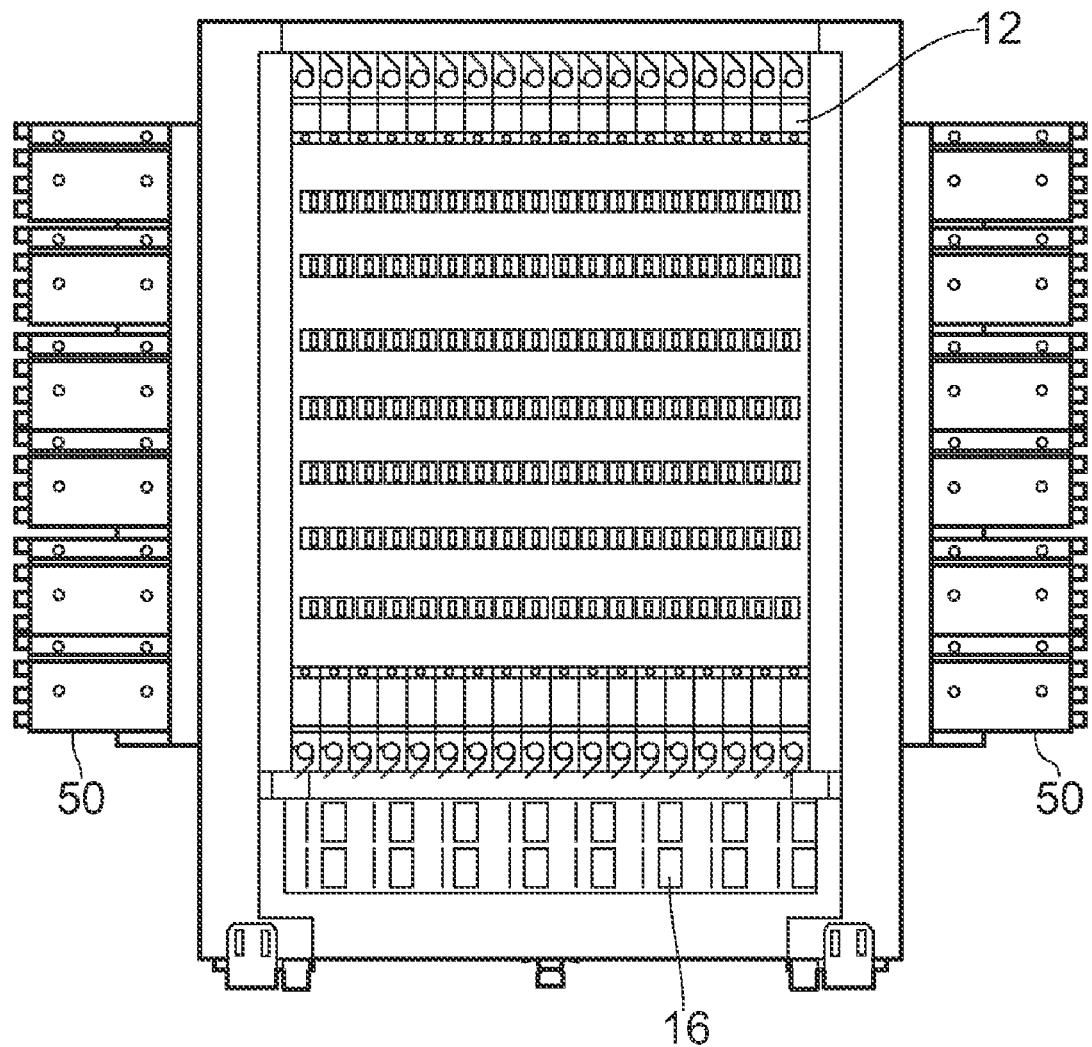
Figure 7:
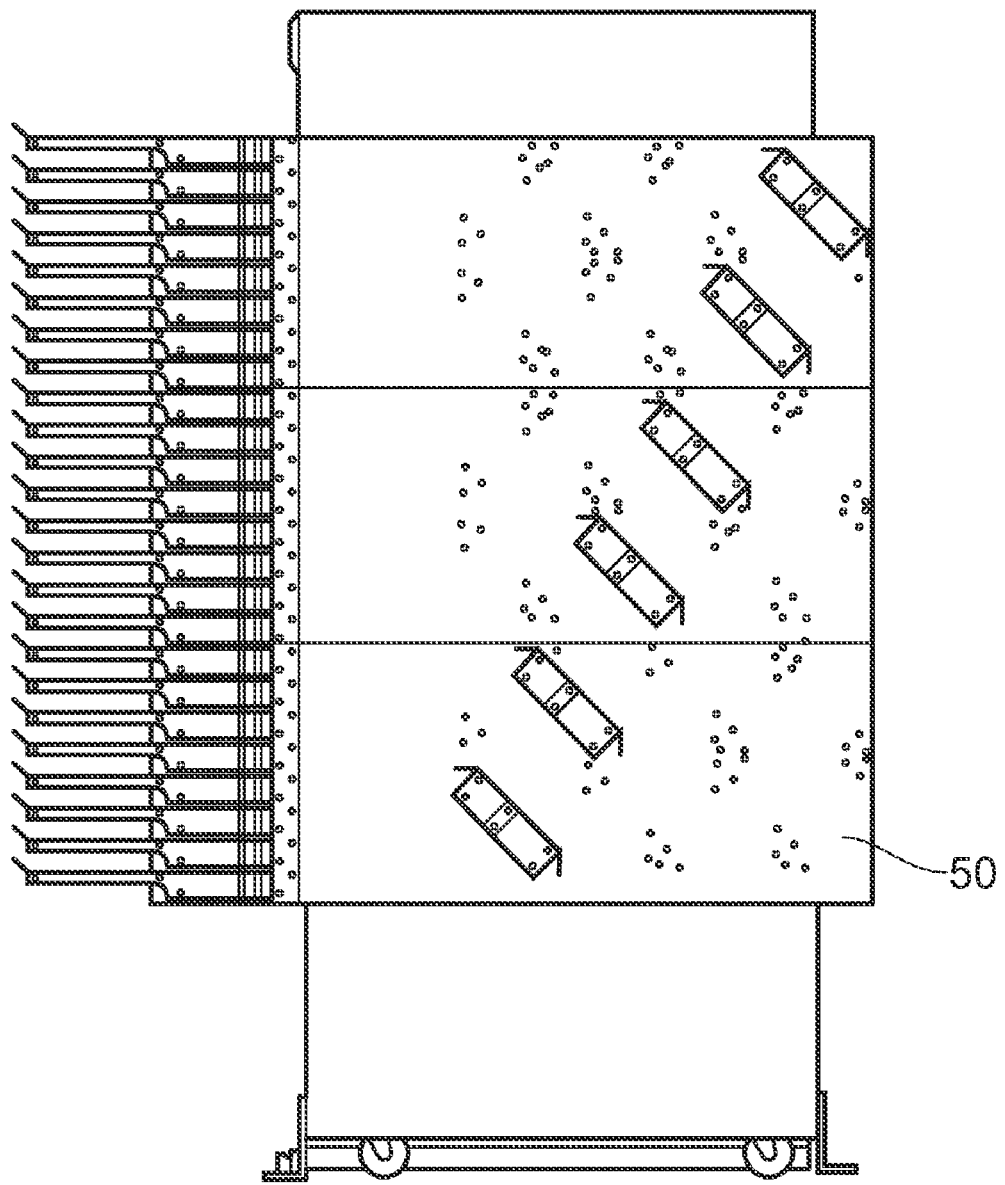
Figure 8:
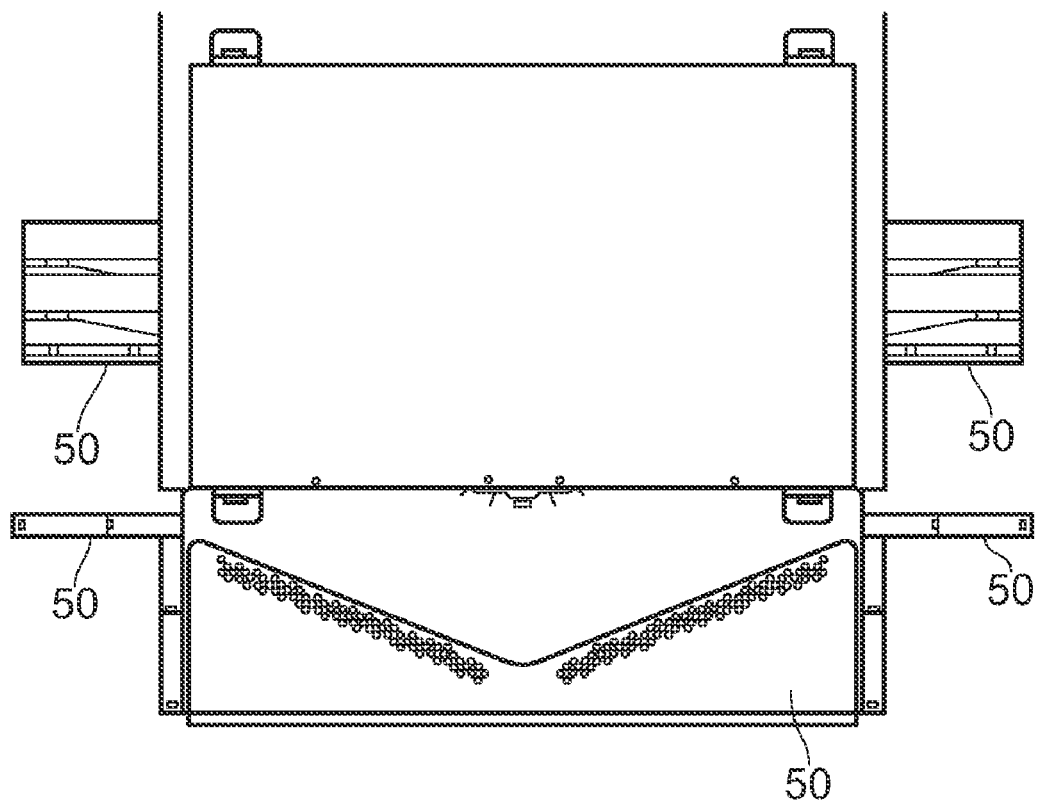
Figure 9:
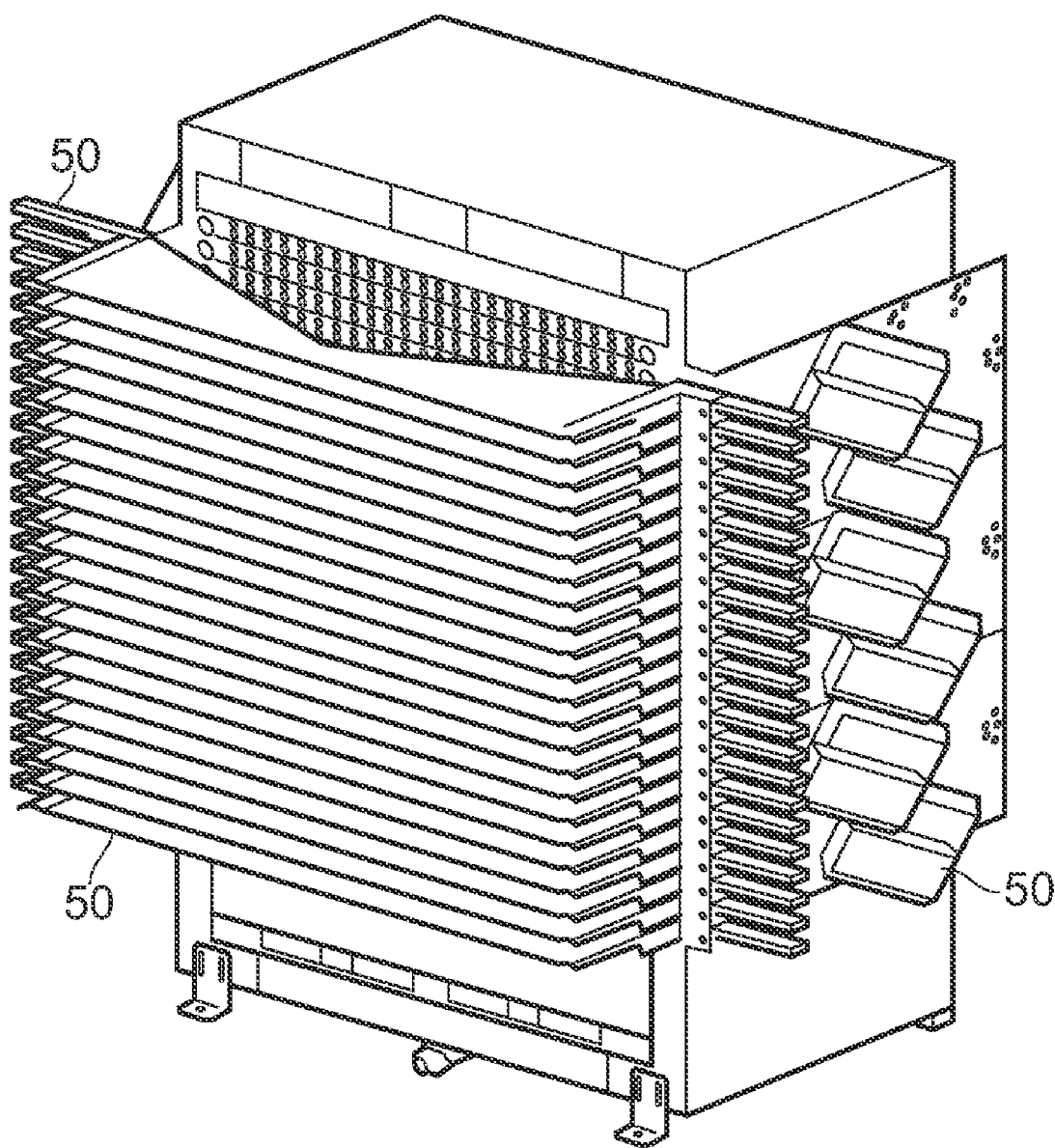
Figure 10:
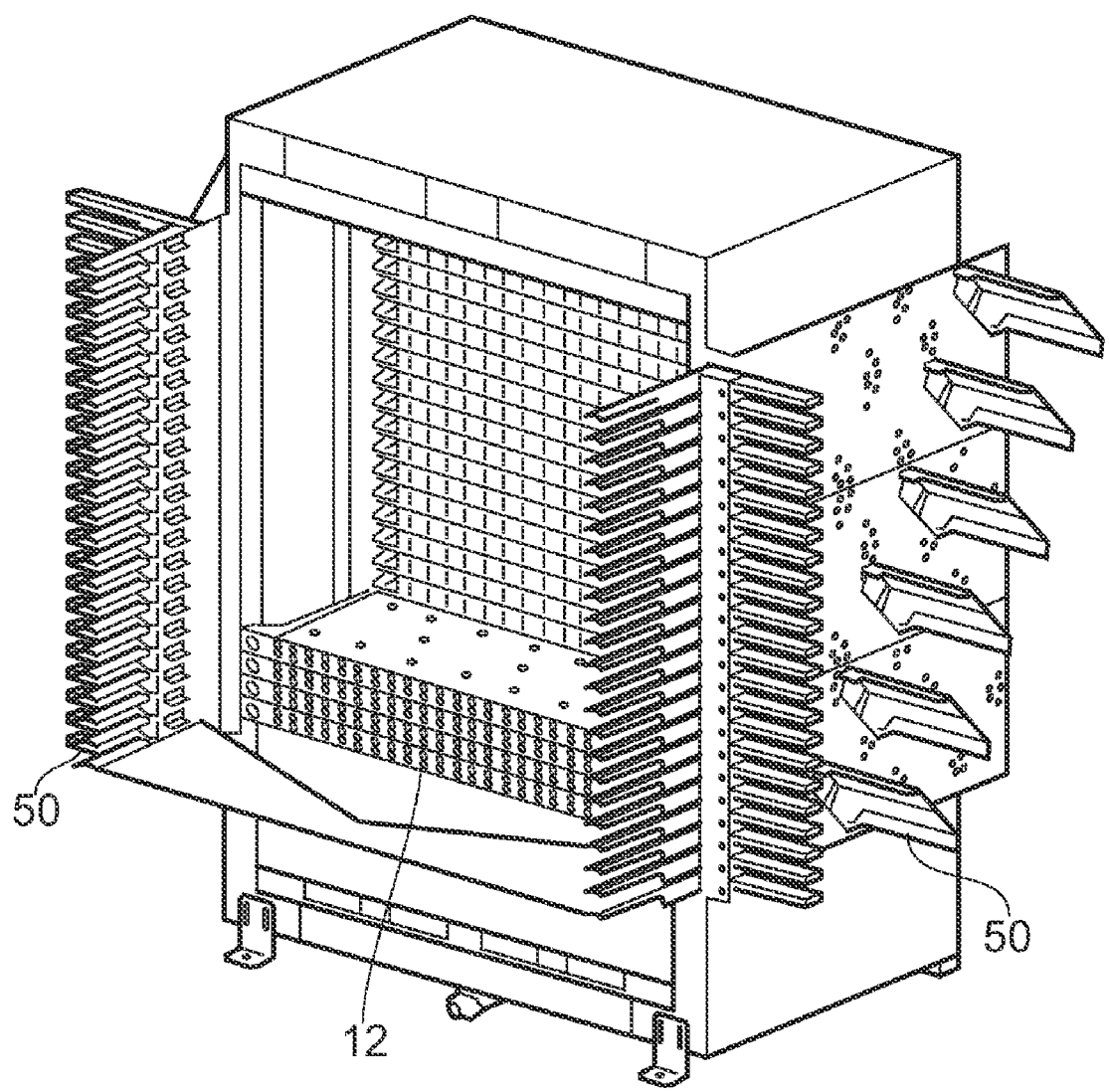
Figure 11:
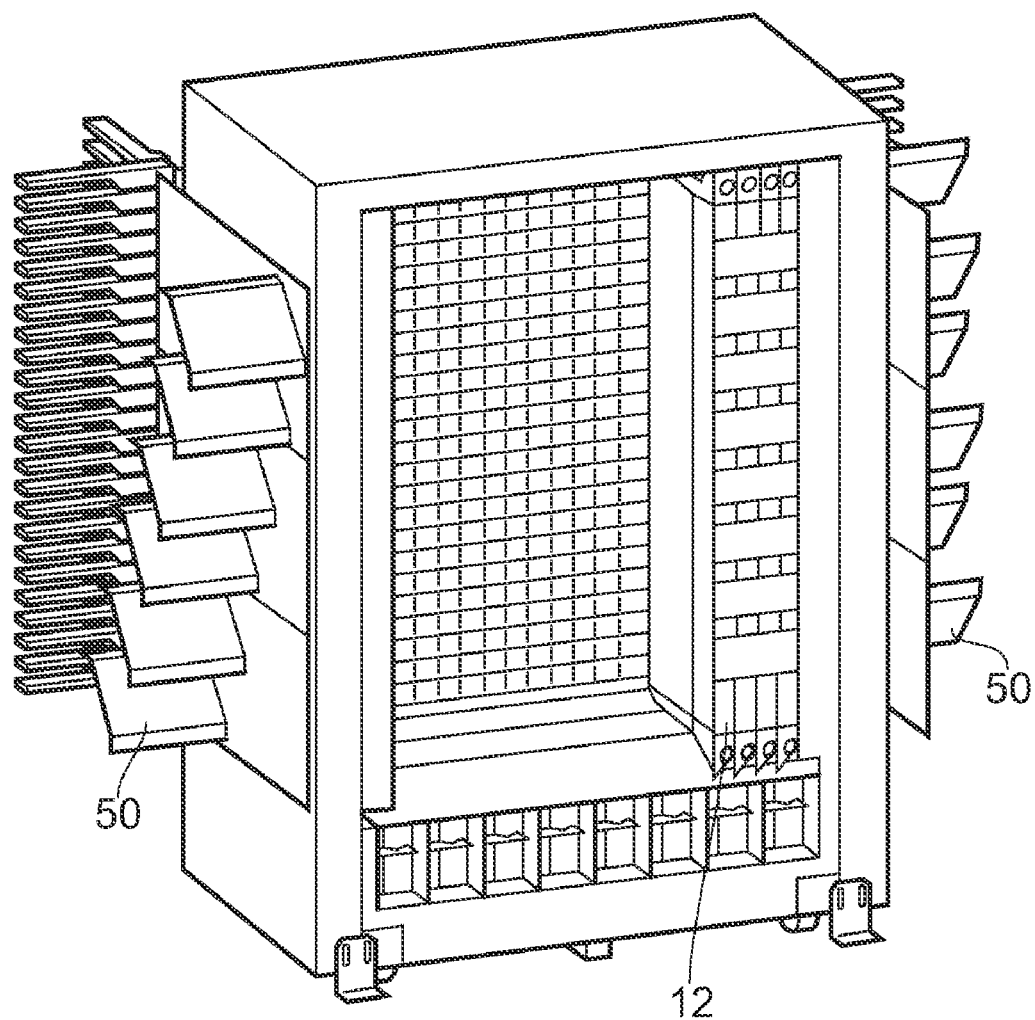

FIG. 5 is a front view of the switch chassis 10 showing cable management structures 50. FIG. 6 is a rear view of the switch chassis 10 showing the fabric cards 12, the power supply units 16 and cable management structures 50. FIG. 6 is a side view of the switch chassis 10 further showing the cable management structures 50. FIG. 8 is a side view of the switch chassis 10 further showing the cable management structures 50. FIG. 9 is an isometric view of the switch chassis 10 from the line card 14 (front) side further showing the cable management structures 50. FIG. 10 is an isometric view of the switch chassis 10 from the line card 14 (front) side showing four line cards 12 installed horizontally in the chassis 10 and part of the cable management structures 50. FIG. 11 is an isometric view of the switch chassis 10 from the fabric card 12 (rear) side showing four fabric cards 12 installed vertically in the chassis 10 and part of the cable management structures 50.

Figure 12:
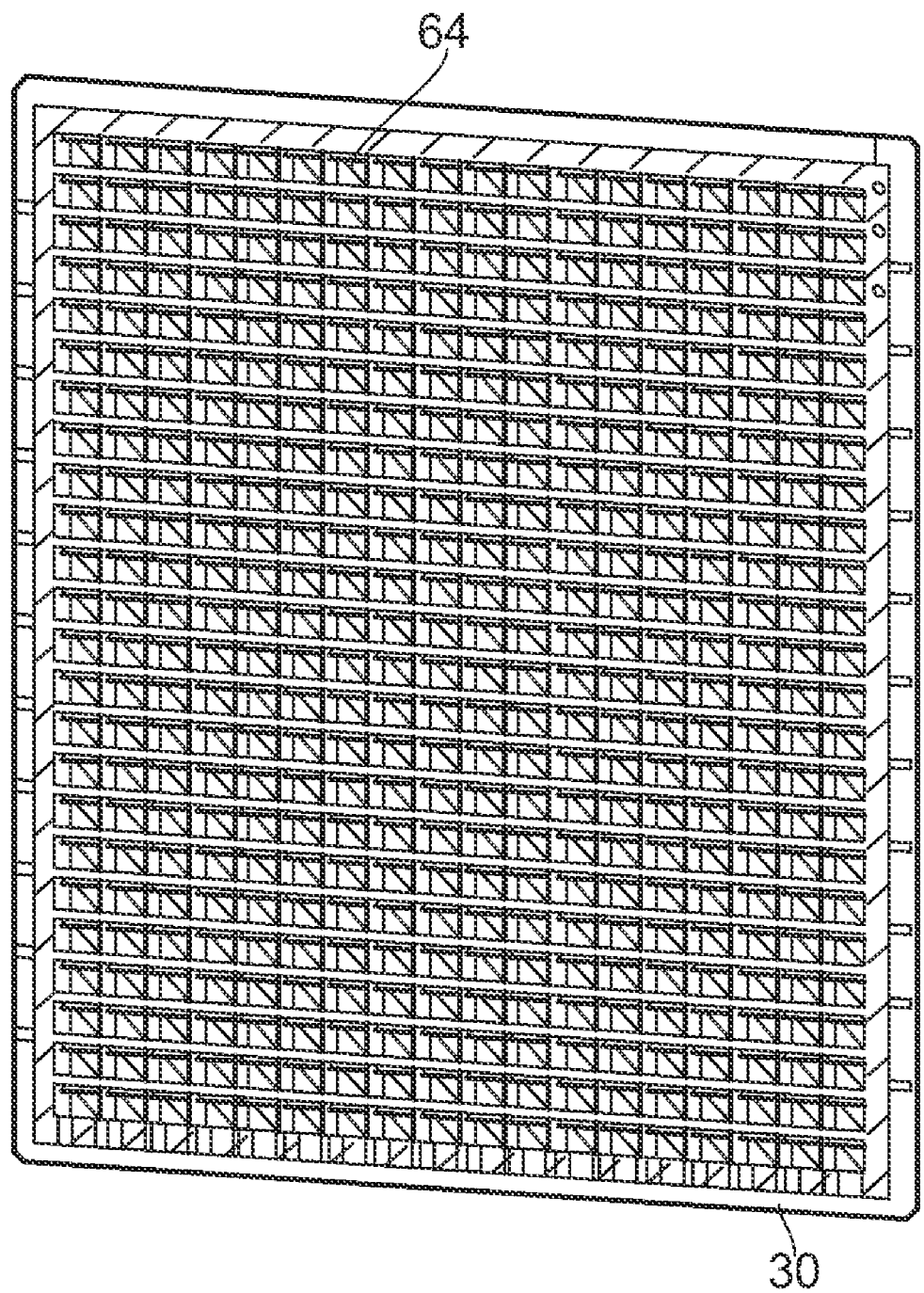
FIG. 12 is a first isometric view of an example of a midplane.
Figure 13:
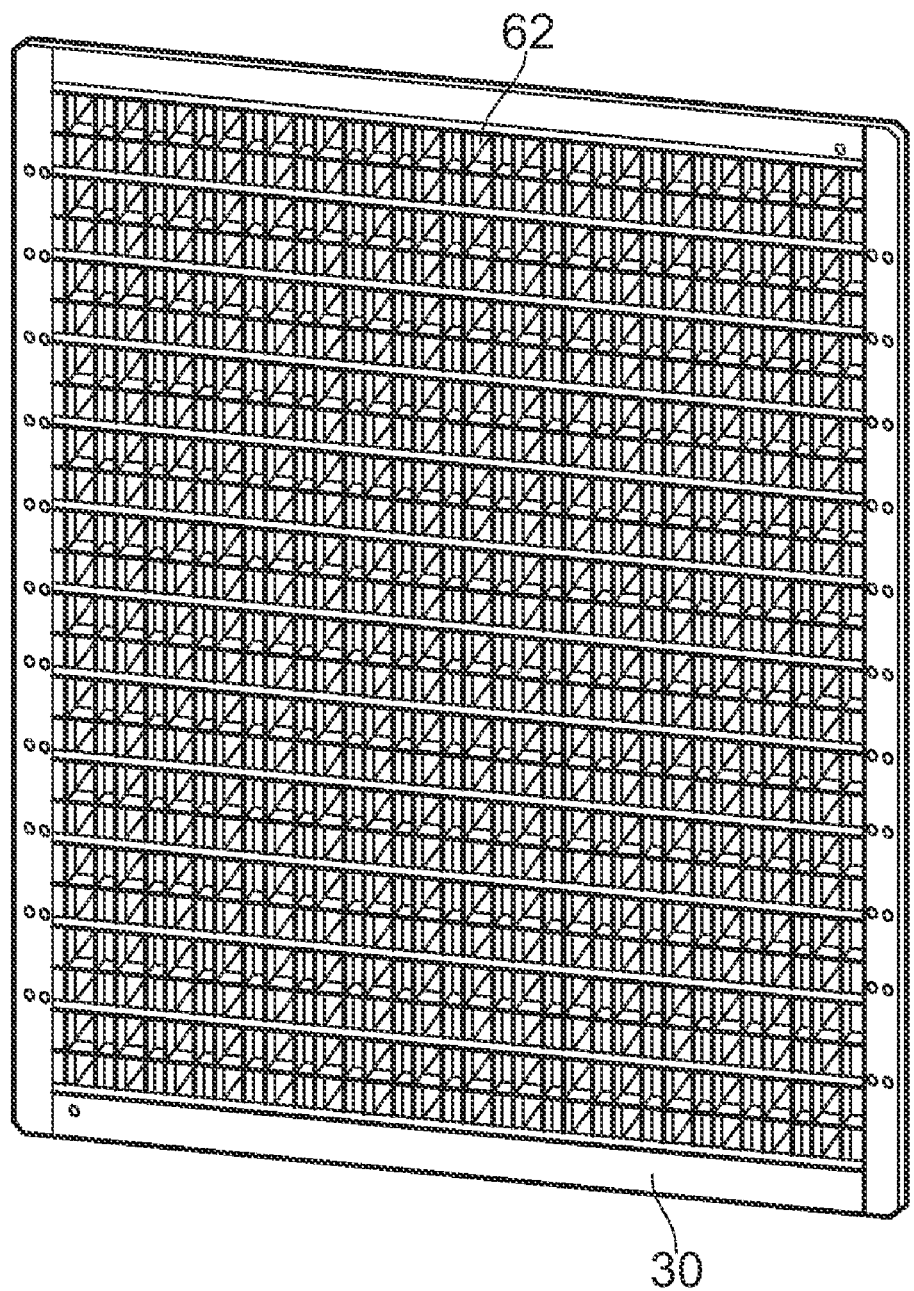
FIG. 13 is a further isometric view of an example of a midplane.

FIGS. 12 and 13 provide various schematic views of an example of a midplane 30 in accordance with the invention. FIG. 12 is an isometric view of the midplane 30 from the line card 14 (front) side and FIG. 13 is an isometric view of the midplane 30 from the fabric card 12 (rear) side. FIG. 12 shows the array formed from rows and columns of the second connectors 64 of the midplane connectors pairs 32 described with reference to FIG. 3. FIG. 13 shows the array formed from rows and columns of the first connectors 62 of the midplane connectors pairs 32 described with reference to FIG. 3.

Figure 14:
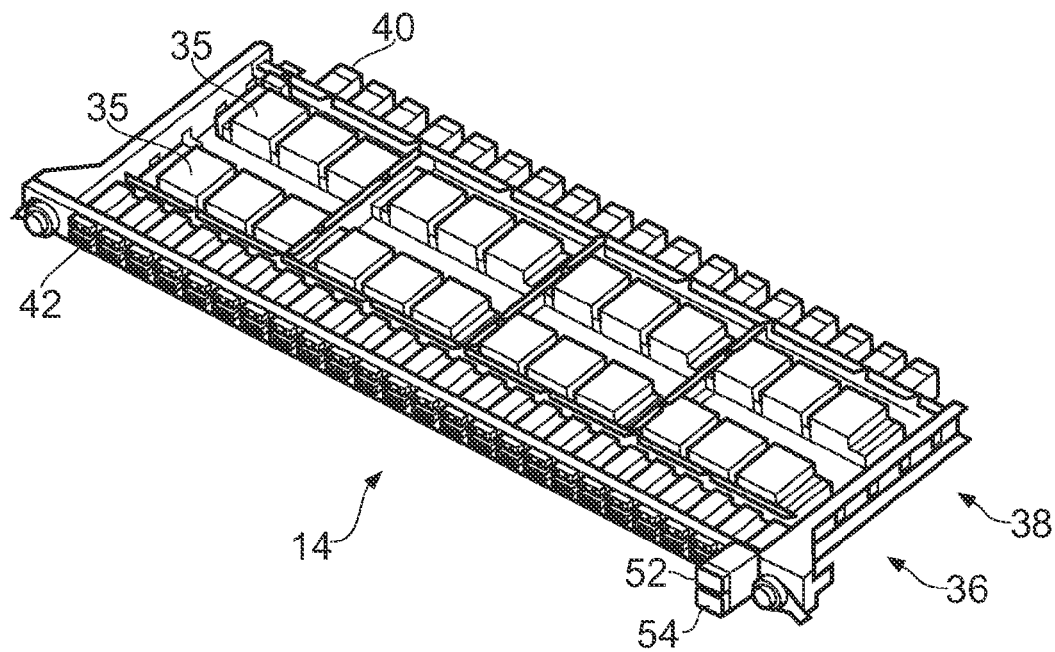
FIG. 14 is an isometric view of an example of a line card.

FIG. 14 is an isometric view of an example of a line card 14. This shows the first and second rows 36 and 38 of switch chips 35, the line board connectors 40 and the cable connectors 42. As can be seen in FIG. 14, the cable connectors 42 are stacked double connectors such each cable connector can connect to two cables 52 and 54.

Figure 15:
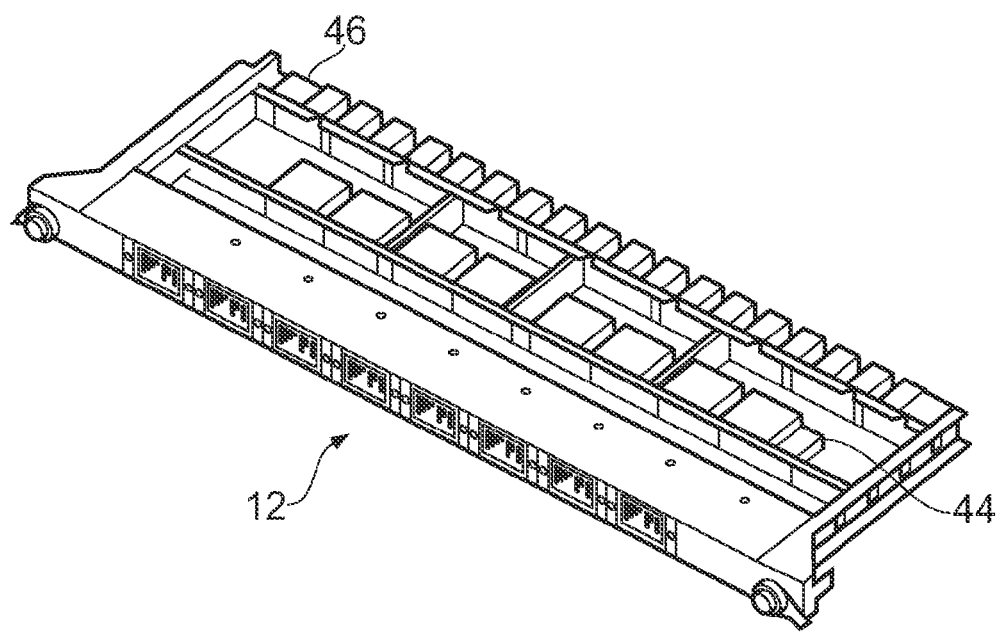
FIG. 15 is an isometric view of an example of a fabric card.

FIG. 15 is an isometric view of an example of a fabric card 12. This shows the fabric card connectors 46 and the switch elements 44.

Figure 16:
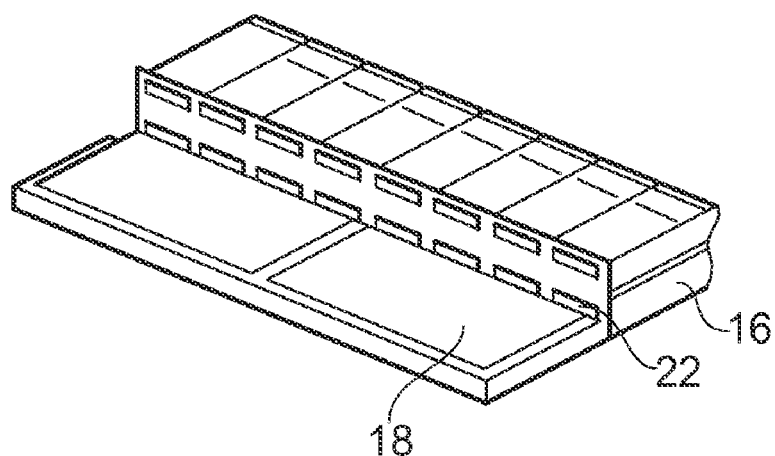
FIG. 16 is schematic representations of part of a switch chassis.
Figure 17:
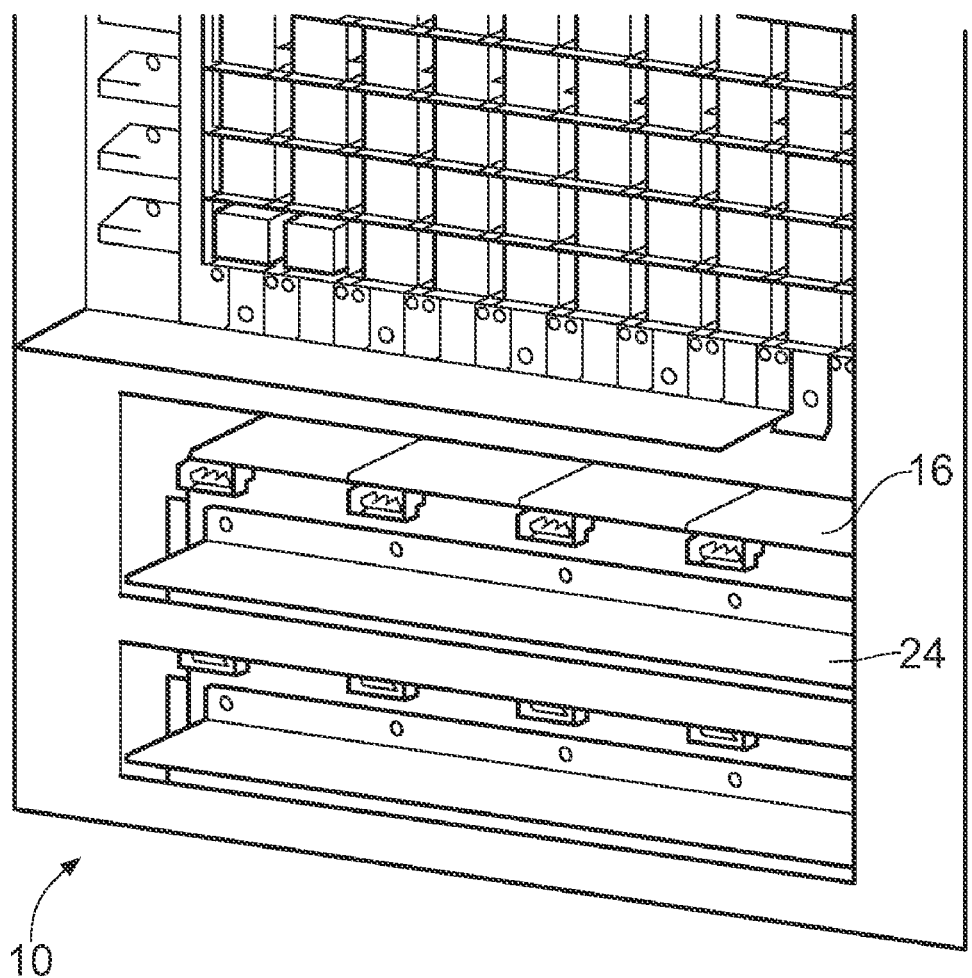
FIG. 17 is a further schematic representation of part of a switch chassis.

FIG. 16 is a schematic representation of an example of two chassis management controllers 18 plugged into one side of a power distribution board 22 and 16 power supply units 16 plugged into the other side of the power distribution board 22. In the present example, the chassis management controllers 18 are plugged into the front side of the power distribution board 22 and the power supply units 16 are plugged into the rear side of the power distribution board 22 as mounted in the switch chassis. FIG. 17 illustrates bus bars 24 for a 3.3V standby supply.

In the present example the midplane 30 is a passive printed circuit board that has dimensions of 1066.8 mm (42")×908.05 mm (35.75")×7.1 mm (0.280"). The active area is 40"×34". 864 8×8 midplane connectors (432 midplane connectors per side) are provided. There is a ribbon cable connection the power distribution board 22 and a 3.3V standby copper bar to the power distribution board 22.

In the present example a fabric card 12 comprises a printed circuit board with dimensions of 254 mm (10")×1016 mm (40")×4.5 mm (177"). It comprises 24 8×8 fabric card connectors 46, one power connector 39, 8 fan module connectors and 8 switch chips 44.

In the present example a line card 14 comprises a printed circuit board with dimensions of 317.5 mm (12.5")×965.2 mm (38")×4.5 mm (177"). It comprises 24 stacked cable 168-circuit connectors 42, 18 8×8 card connectors 40, 1 busbar connector and 24 switch chips 35.

In the present example a power distribution board 22 comprises a printed circuit board, 16 power supply DC connectors, 14 6×6 card connectors (7 connectors per chassis management card 18, ribbon cable connectors for low-speed connectivity to the midplane 30, and a 3.3V standby copper bar to the midplane 30.

In the present example a chassis management card 18 comprises 14 6×6 card connectors (7 connectors per chassis management card), two RJ45 connectors for Ethernet available on a chassis management card panel, two RJ45 connectors for serial available at the chassis management card panel, three RJ45 for line card/fabric card debug console access at the chassis management card panel, three HEX rotary switches used to select between which line card/fabric card debug console is connected to the three RJ45s above, and a 220-pin connector for the mezzanine.

In the present example a mezzanine has dimensions: 92.0 mm×50.8 mm and comprises 4 mounting holes screw with either 5 mm or 8 mm standoff from the chassis management card board, a 220-pin connector for connectivity to chassis management board.

Figure 18:
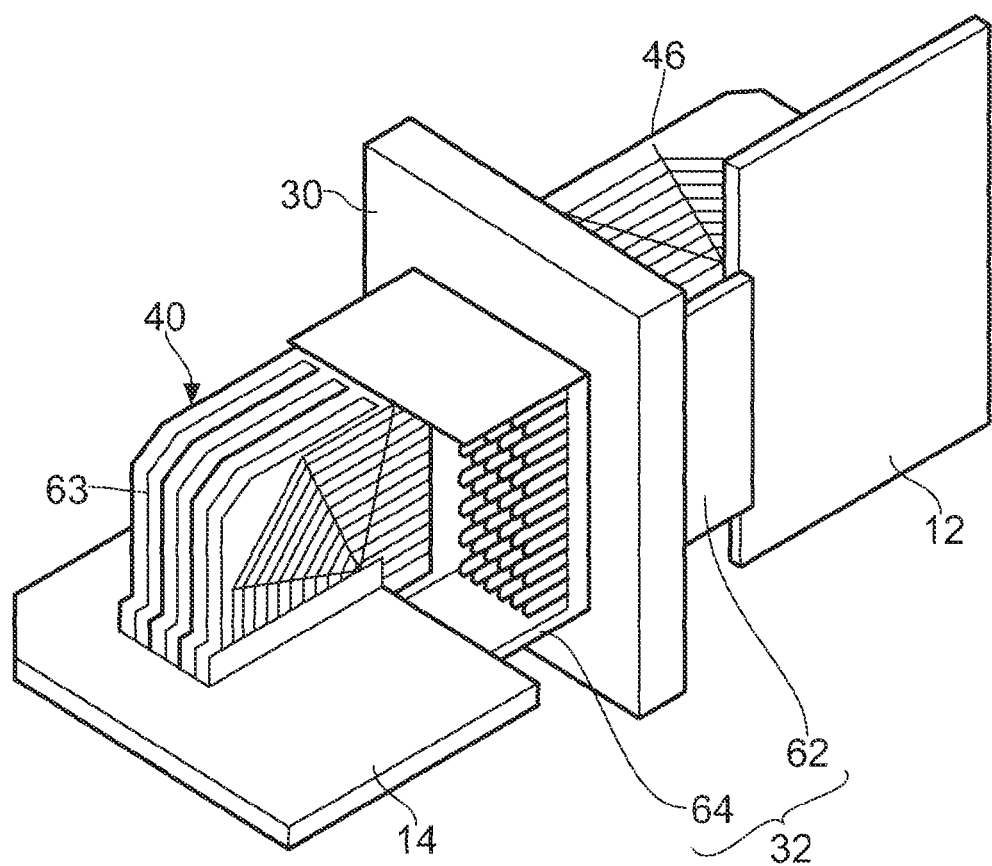
FIG. 18 is a schematic representation of the connections of two cards orthogonally with respect to each other.

FIG. 18 is a schematic isometric view of an example of a midplane connector pair 32. As can be seen in FIG. 18, the connector comprises a first, fabric side, connector 62 and a second, line card side, connector 64. In this example, each of the connector 62 and 64 is substantially U-shaped and comprises an 8×8 array of contact pins.

It will be noted that the second connector 64 of the midplane connector pair 32 is rotated through substantially 90 degrees with respect to the first connector 62. The first connector 62 is configured to connect to a corresponding fabric card connector 46 of a fabric card 12. The second connector 62 is configured to connect to a corresponding fabric card connector 46 of a line card 14. Through the orientation of the second connector 64 of the midplane connector pair 32 substantially orthogonally to the orientation of the first connector 62, it can be seen that the line card 14 is mounted substantially orthogonally to the fabric card 12. In the present example the line card 14 is mounted substantially horizontally and the fabric card is mounted substantially vertically 12.

Each of the contact pins on the connector 62 is electrically connectable to a corresponding contact of the fabric card connector 46. Each of the contact pins on the connector 64 is electrically connectable to a corresponding contact of the line card connector 40. The connector pins of the respective connectors 62 and 64 are connected by means of pass-through vias in the midplane 30 as will now be described in more detail.

Figure 19:
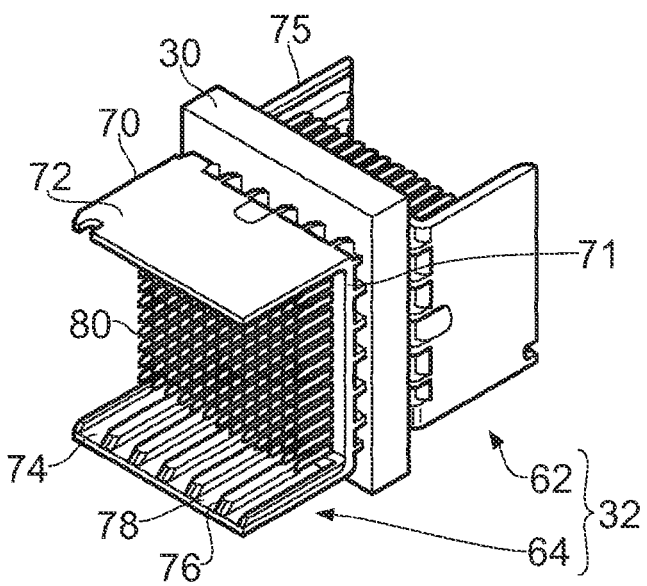
FIG. 19 is a schematic representation of an example of orthogonally arranged connectors.

FIG. 19 illustrates an example of the configuration of a first midplane connector 62 and a second midplane connector 64 of a midplane connector pair 32 in more detail. In the example shown in FIG. 19 that second connector 64 (the line card side connector) comprises a substantially U-shaped frame 70 including a substantially planar base 71 and first and second substantially planar walls 72 and 74 that extend at substantially at 90 degrees from the base 71. The inside edges of the first and second substantially planar sides 72 and 74 are provided with ridges 76 and grooves 78 that provide guides for the line card connector 40.

As can be seen in FIG. 18, the line card connector 40 has a structure that comprises a plurality of contact planes 63 that are aligned side by side, such that it has a generally planar construction that extends up from the line card 14. Line card connector planes comprise printed circuit boards carrying traces leading to contacts. The traces and contacts can be provided on both sides of the printed circuit boards of the line card connector planes.

By comparing FIGS. 18 and 19, it can be seen that each contact plane 63 of the line card connector 40 can be entered into a respective one of the grooves 78 so that connectors of the line card connector 40 can then engage with contact pins 80 of the second connector 64. In the case of the line card side connector portion 64, the orientation of second connector 64 and the grooves 78 therein means that the line card 12 is supported in a substantially horizontal orientation. In the example shown in FIG. 19, an 8×8 array of connector pins 80 is provided.

The first midplane connector 62 (fabric card side connector) of the midplane connector pair 32 has substantially the same form as the second midplane connector 62 of the midplane connector pair 32, except that it is oriented at substantially 90 degrees to the second midplane connector 64. In this example the second midplane connector 62 comprises a substantially U-shaped support frame 75 including a substantially planar base and first and second substantially walls and that extend at substantially at 90 degrees from the base. The inside edges of the first and second substantially planar sides are provided with ridges and grooves that provide guides for the fabric card connector 46. The fabric card connector 46 has the same basic structure as that of the line card connector 40 in the present instance. Thus, in the same way as for the line card connector, each of a plurality of contact planes of the fabric card connector 46 can be entered into a respective one of the grooves so that connectors of the fabric card connector 46 can then engage with contact pins of the first connector 62. The orientation of the first connector 62 and the grooves therein means that the fabric card 12 is supported in a substantially vertical orientation.

In the example illustrated in FIG. 19, the orthogonal connector 60 provides an 8×8 array of connector pins 80 is provided that can support supports 64 differential pairs or 32 bi-directional serial channels (two wires per direction) in a footprint of 32.2×32.2 mm.

As mentioned above, the contact pins of the first and second midplane connectors 62 and 64 of a midplane connector pair 32 are connected by means of pass through vias in the midplane.

Figure 20:
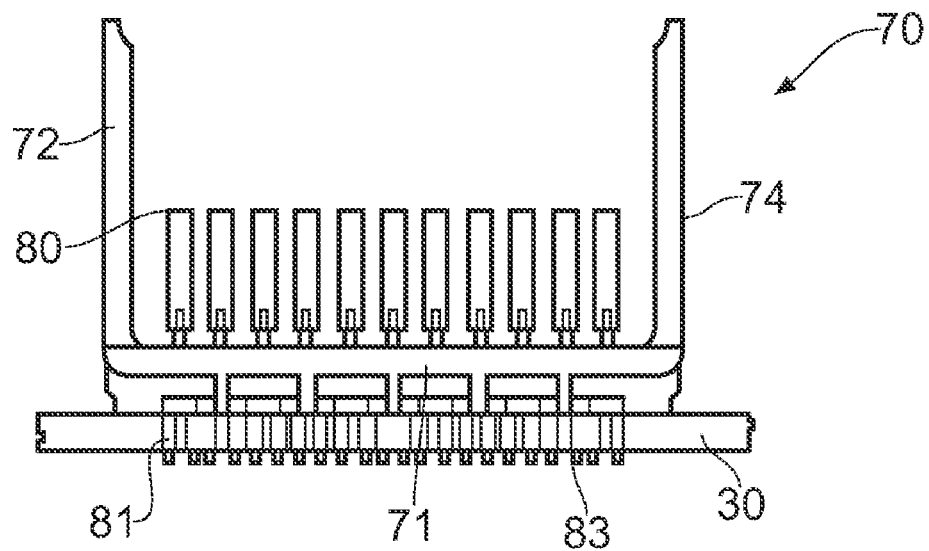
FIG. 20 is a schematic side view of one of the connectors of FIG. 19.

FIG. 20 illustrates a side view of an example of a midplane connector, for example the midplane connector 62 mounted on the midplane. In the example shown in FIG. 20 the midplane connector 64 comprises a substantially U-shaped frame 70 including a substantially planar base 71 and first and second substantially planar walls 72 and 74 that extend at substantially at 90 degrees from the base 71. The contact pins 80 are each connected to pairs of contact tails 81 that are arranged in sprung pairs that are arranged to be push fitted into pass through vias 83 in the midplane 30.

In use, the other midplane connector (e.g., the first midplane 62) of the midplane connector pair would be inserted into the pass through vias in the other side of the midplane 30 in the orthogonal orientation as discussed previously.

Figure 21:
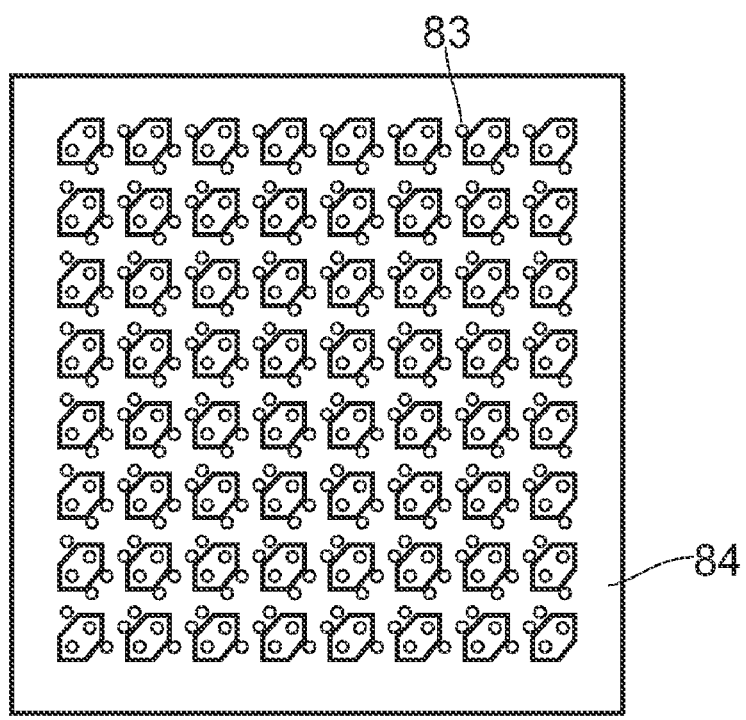
FIG. 21 is a plan view of an example configuration of vias for the orthogonal connector pairing of FIG. 19.
Figure 22:
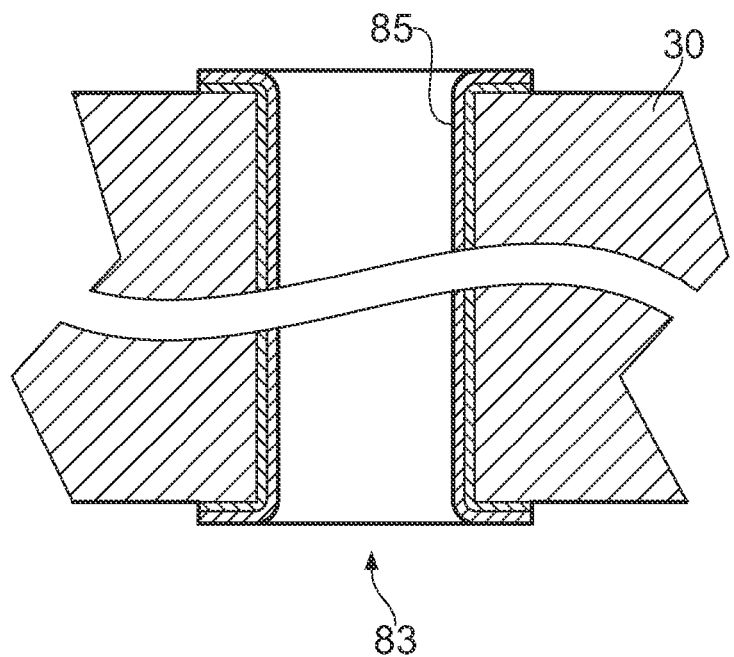
FIG. 22 is a cross-section through of a via.

FIG. 21 is a schematic representation of an area of the midplane for receiving the midplane connectors 62 and 64 of the midplane connector pair 32. This shows the array of vias 83. FIG. 22 is a schematic cross-section though such a via 83 in the showing the conductive wall 85 of the via 83. The conductive wall 85 can be formed by metal plating the wall of the via, for example.

Figure 23:
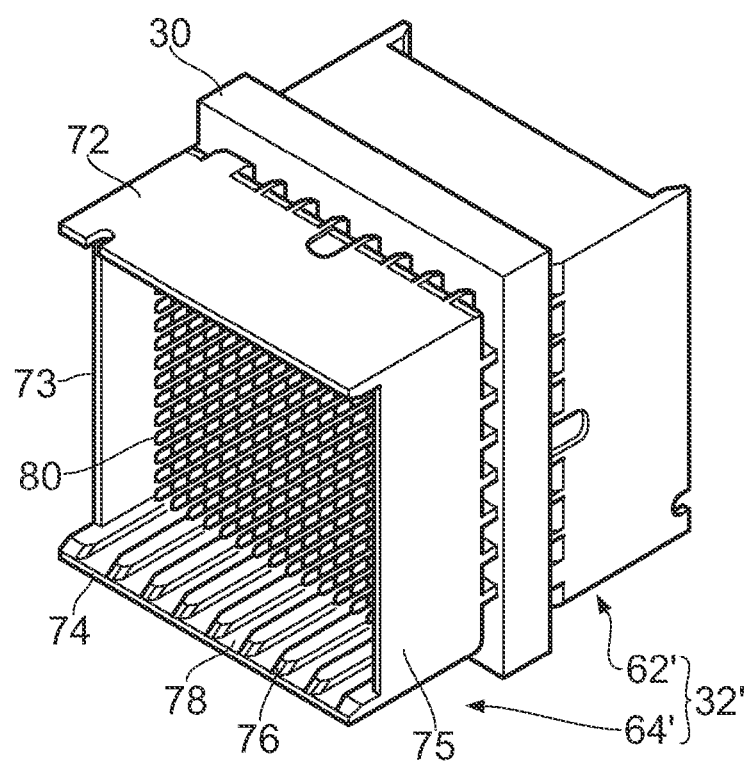
FIG. 23 is a schematic side view of example of an alternative to the connector of FIG. 20.

The examples of the midplane connectors described with reference to FIGS. 18 and 20 had a generally U-shape. However, other configurations for the midplane connectors are possible. For example FIG. 23 illustrates another example of a midplane connector pair 32', where the first and second midplane connectors 62' and 64' are generally the same as the first and second midplane connectors 62 and 64 described with reference to FIG. 19 except that, in addition to the first and second walls 72 and 74, third and fourth walls 73 and 75 are provided. The additional walls provide a generally box-shaped configuration that can facilitate the insertion and support for the cards to be connected thereto.

It will be appreciated that in other embodiments the first and second midplane connectors could have different shapes and/or configurations appropriate for the connections for the cards to be connected thereto.

The array of midplane connector pairs 32 as described above provides outstanding performance in excess of 10 Gbps over a conventional FR4 midplane because the orthogonal connector arrangements allow signals to pass directly from the line card to the fabric card without requiring any signal traces on the midplane itself. The orthogonal arrangements of the cards that can result from the use of the array of orthogonally arranged connector pairs also avoids the problem of needing to route a large number of signals on the midplane to interconnect line and fabric cards, minimizing the number of layers required. This provides a major simplification compared to existing fabric switches. Thus, by providing an array of such orthogonal connectors, each of a set of horizontally arranged line cards 12 can be connected to each of a set of vertically aligned fabric cards without needing intermediate wiring.

Figure 24:
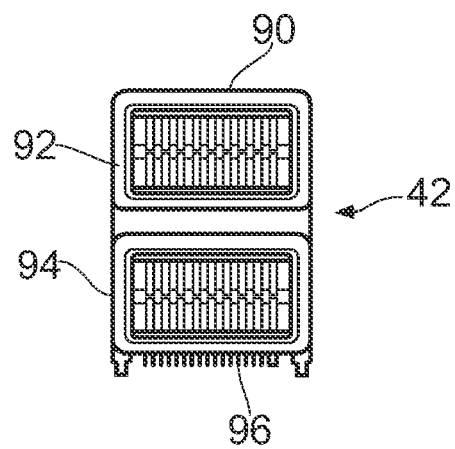
FIG. 24 is a schematic end view of an example cable connector.
Figure 25:
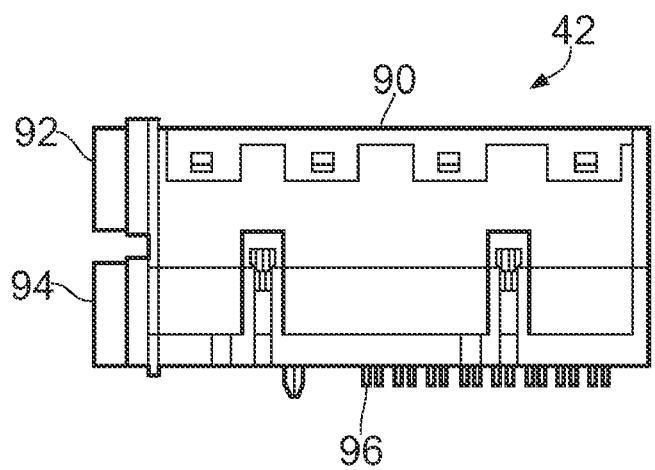
FIG. 25 is a schematic side view of the example cable connector.
Figure 26:
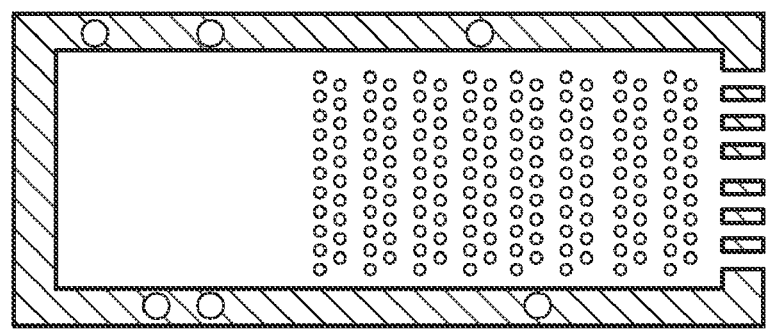
FIG. 26 represents a footprint of the cable connector.

FIGS. 24 and 25 provide an end view and a side view, respectively, of an example of a cable connector 42 as mentioned with reference to FIGS. 3 and 14. As shown in FIGS. 24 and 25, the cable connectors 24 and 25 include first and second cable connections 92 and 94 stacked within a single housing 90. This provides for a very compact design. Board contacts 96 are provided for connecting the connector to a line card 14. FIG. 26 is a plan view of the connector footprint for the board contacts 96 of the cable connector 42. The stacked arrangement facilitates the providing of line cards that are high density line cards supporting a 12× cable providing 24 line pairs with 3 4× links aggregated into a single cable. The cable connectors provide 12× cable connectors that are smaller than a conventional 4× connector, 3× denser than a standard InfiniBand 4× connector and electrically and mechanically superior. Using 12× cable (24 pairs) can be almost 50% more area efficient than three 4× cables and requires three times fewer cables to install and manage.

Figure 28:
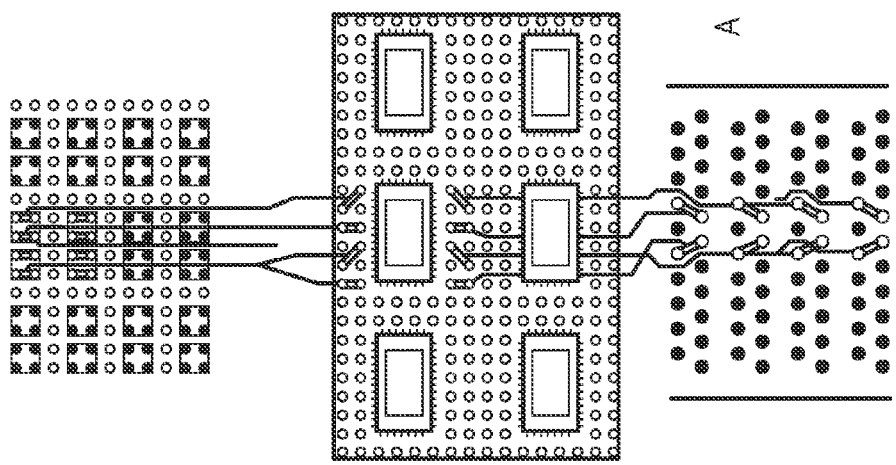
FIGS. 27 and 28 illustrates example of signal routing for a cable connector.
Figure 27:
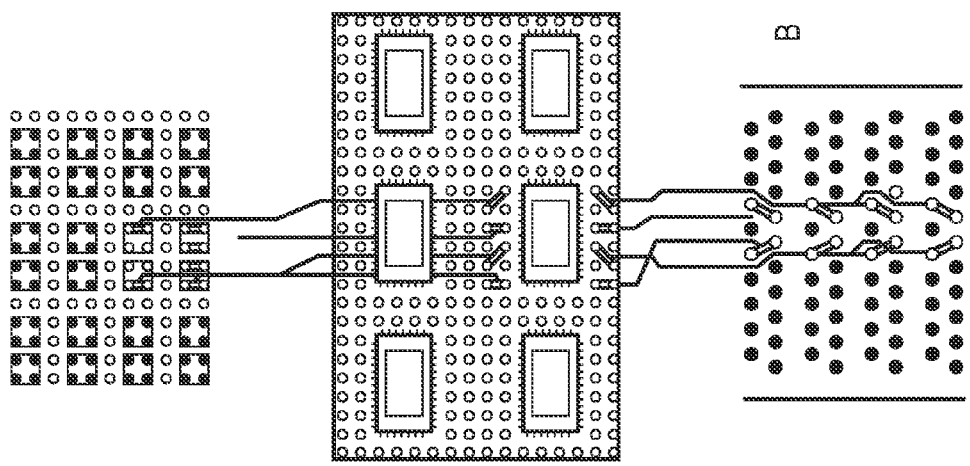

FIGS. 27 and 28 illustrate an example of the routing of signals from each of two 12× port sections 92 and 94 of a cable connector 42 to the equalizers and to a switch chip on a line card 14. FIG. 27 shown an example of routing from a first 12× port section. FIG. 28 shows an example of the routing from a second 12× port section. The transmit (Tx) lines are equalized, and can be connected directly from the switch chip to the cable connector. The can be routed on lower layers in order to minimize via stub effects.

Figure 29:
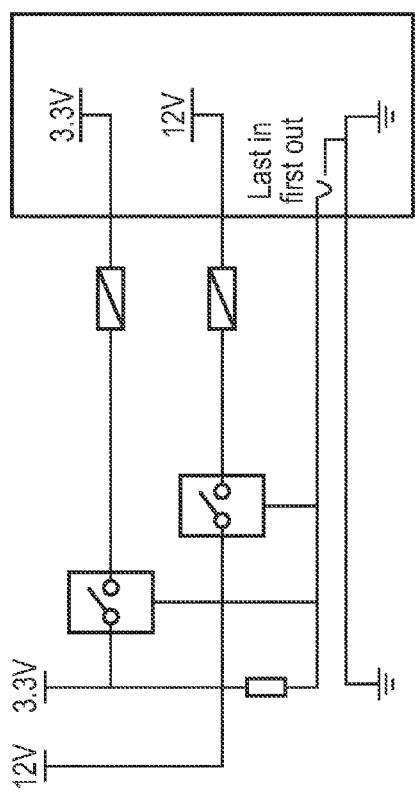
FIG. 29 illustrates an example of a power supply for the cable connector.
Figure 30:
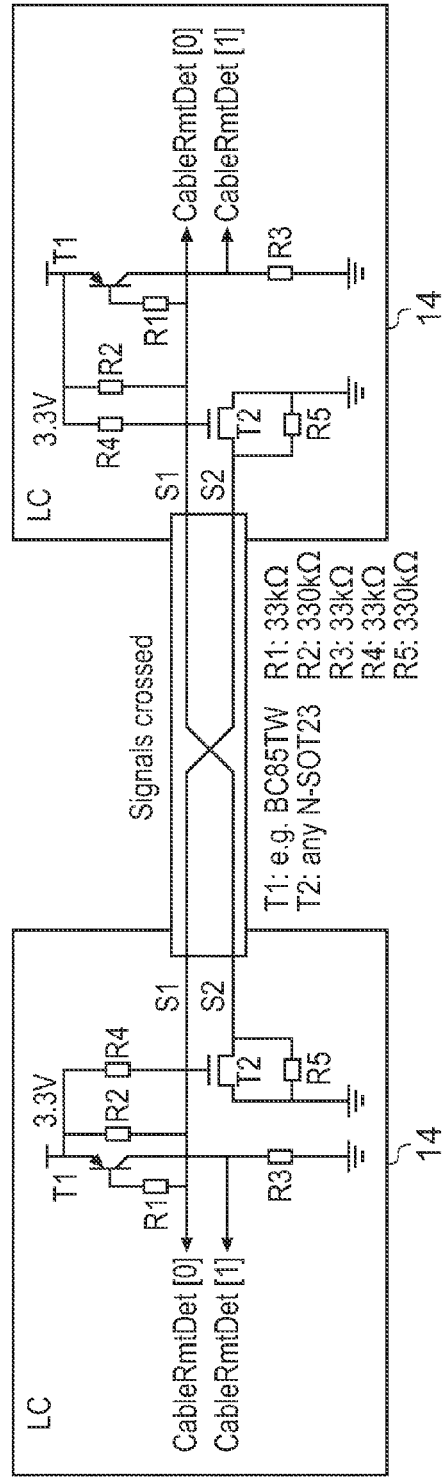
FIG. 30 illustrates an example of cable status sense detection circuitry.
Figure 31:
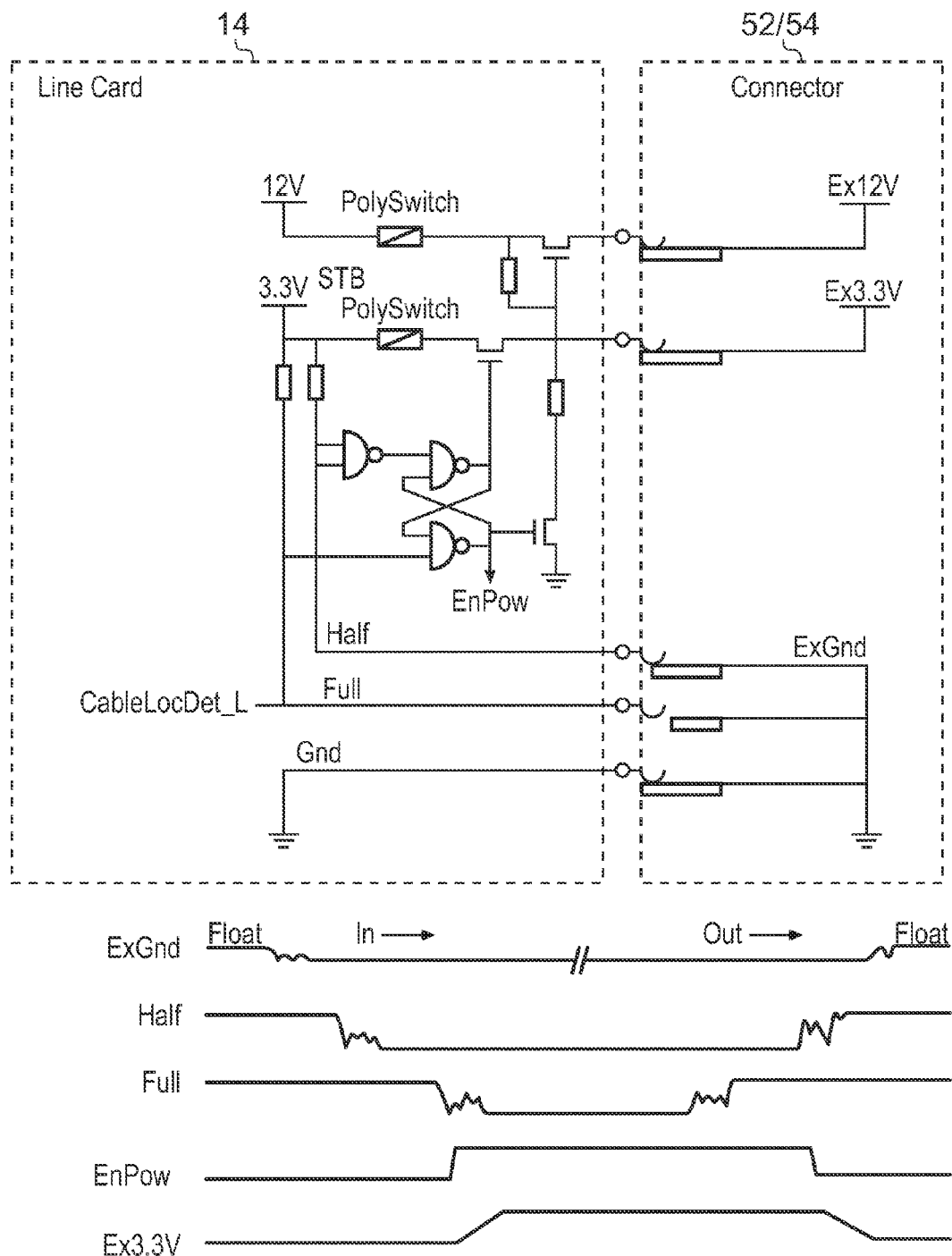
FIG. 31 illustrates an example of hot plug control circuitry.

FIG. 29 illustrates an example of a power supply for the cable connector and FIG. 30 illustrates an example of a cable status sense detection circuitry. The cable sense detection circuitry is operable to test from each end whether the other end is plugged or not, and, if plugged, to see if power from the power supply is on. Provisions are made such that "leaking" power from a powered to un-powered end is avoided. A valid status assumes that an active end is plugged. FIG. 31 is a schematic diagram of an example of a hot plug control circuit that enables hot plugging of cables. The switch chassis can thereby provide active cable support for providing active signal restoration at a cable connector. Active cable support can provides benefits of increased distances for copper cables as a result of active signal restoration at the connector, increased maximum cable distance by over 50%, using thinner and more flexible cables (e.g., reducing a cable diameter by up to 30%, which facilitates good cable management. A cable to connector interface can provide one, more or all of local and remote cable insertion detection, cable length indication, remote node power-on detection, remote power, a serial number and a management interface.

Figure 32:
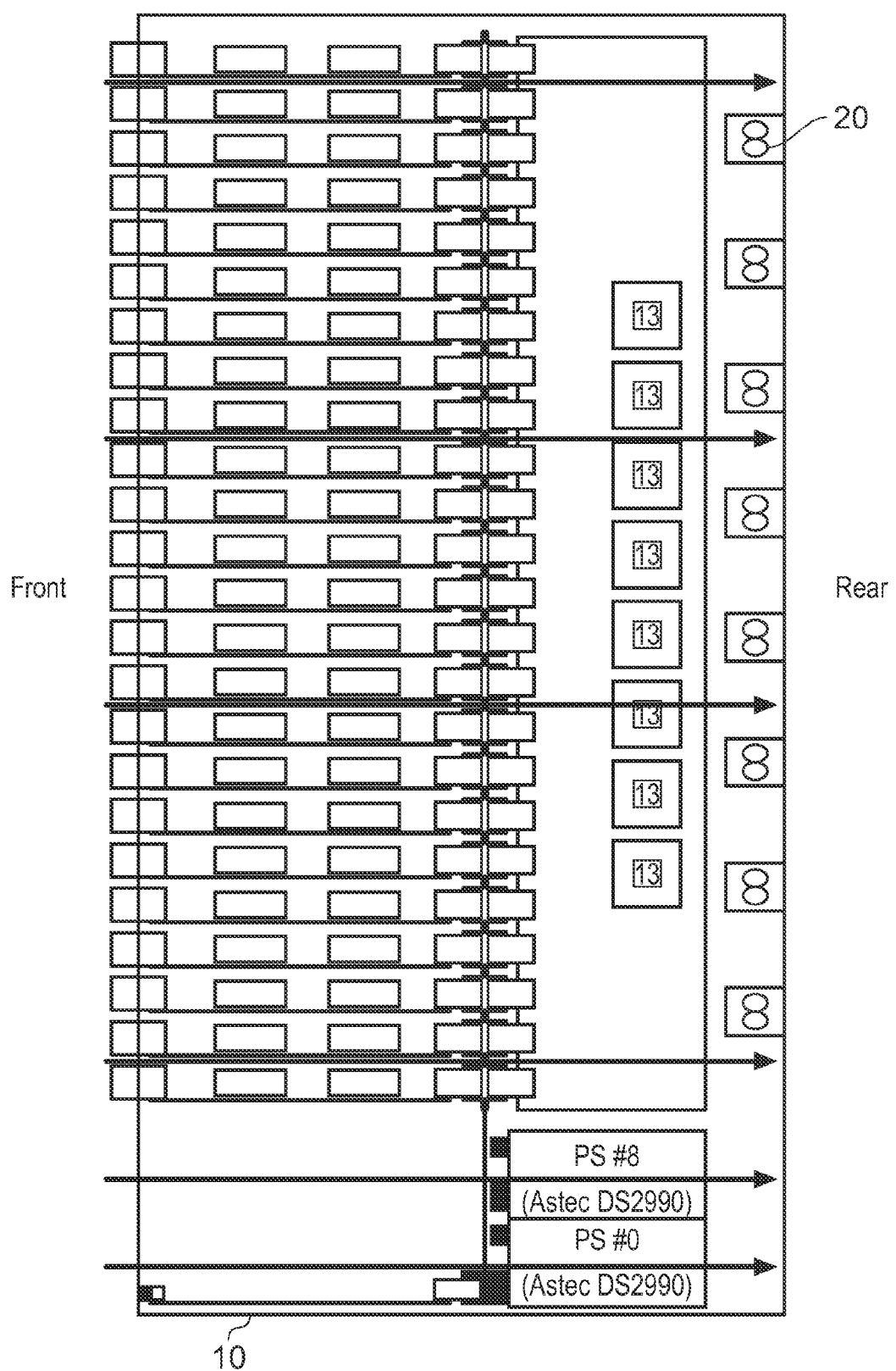
FIG. 32 is a schematic representation of airflow though a switch chassis.

FIG. 32 is a schematic representation of the airflow through an example switch chassis. As illustrated by the arrows, the airflow is from the front to the rear, being drawn through by fans 20 in the fabric cards 12 and the power supplies 18.

The air inlet is via perforations at the line card 14 front panel. Fans 20 at the fabric cards 12 pull air across the line cards, though the openings 34 in the vertical midplane 30 and across the fabric cards 12.

Line card cooling is naturally redundant since the fabric cards are orientate orthogonally to the line cards. In other words, cooling air over each line card is as a result of the contribution of the effect of the fans of the fabric cards along the line card due to the respective orthogonal alignment. In the case that a fabric card fails or is removed, a portion of the cooling capacity is lost. However, as the cooling is naturally redundant the line cards will continue to operated and be cooled by the remaining fabric cards. Each fan is internally redundant and the fans on the fabric cards 12 can be individually hot swappable without removing the fabric card 12 itself. The fabric card 12 and line card 14 slots can be provided with blockers to inhibit reverse airflow when a card is removed. Empty line card 14 and fabric card 12 slots can be loaded with filler panels that prevent air bypass.

Each power supply has an internal fan that provides cooling for each power supply. Fans at the power supplies pull air through chassis perforations at the rear, across the chassis management cards 18, and through the power supply units 16. Chassis management card cooling is naturally redundant as multiple power supply units cool a single the chassis management card.

It will be appreciated that changes and modifications to the above described embodiments are possible with the scope of the claimed invention. For example, although in the present example cooling if provided by drawing air from the front to the rear, in another example embodiment cooling could be from the rear to the front.

Also, although the fabric cards and the switch cards are described above as being orthogonal to each other, they do not need to be exactly orthogonal to each other. Indeed, in an alternative embodiment they could be angled with respect to each other but need not be exactly orthogonal to each other.

Also, although the midplane connector pairs 32 are configured as first and second connectors 62 and 64 in the above example, in another example they could be configured as a single connector that is assembled in the midplane. For example, through connectors could be provided that extend through the midplane vias. The through connectors could be manufactured to be integral with a first connector frame (e.g., a U-shaped frame or a box-shaped frame as in FIGS. 19 and 23, respectively) and the contacts inserted through the vias from a first side of the midplane 30. Then a second connector frame could be inserted over the connectors on the second side of the midplane 30 in a mutually orthogonal orientation to the first connector frame.

Examples embodiments of a cable management system for the switch will be described in more detail with FIGS. 33 to 39. An example switch chassis supports up to 24 line cards, each of which has 24 dual stack I/O connectors. A cable management system is provided for such a switch chassis that can support up to 1152 cables.

In one example embodiment, a cable management system is provided for a switch chassis as described above that is configured to receive a plurality of line card units, each line card unit having at least one row of line connectors along a first edge of the line card unit, each line connector being configured to receive a cable connector of a cable. The cable management system comprises a cable guide arrangement configured to guide each of a plurality of cables such that, when the respective cable connectors thereof are connected to the line connectors of the at least one row of line connectors, the cables extend out from the first edge of the line card unit and then curve back, whereby the cables can pass at least part way along at least one side of the line card unit. The cable guide arrangement is configured such that said plurality of cables lie substantially within a plane parallel to said at least one row of line connectors as the cables extend out from the first edge and curve back.

In one example, the first edge of the line card unit is a rear of the line card unit, the cable guide arrangement being configured to guide each of a plurality of cables, when the respective cable connectors thereof are connected to the line connectors of the at least one row of line connectors, such that said plurality of cables lie substantially within a plane parallel to said at least one row of line connectors to the rear of the line card unit.

In another example, the first edge of the line card unit is a front of the line card unit, the cable guide arrangement being configured to guide each of a plurality of cables, when the respective cable connectors thereof are connected to the line connectors of the at least one row of line connectors, such that said plurality of cables lie substantially within a plane parallel to said at least one row of line connectors to the front of the line card unit.

As shown in FIGS. 5-11, the cable management system comprises structures 50 that are mounted on the racking of switch chassis to receive cables that extend from line cards mounted in the chassis.

Figure 33:
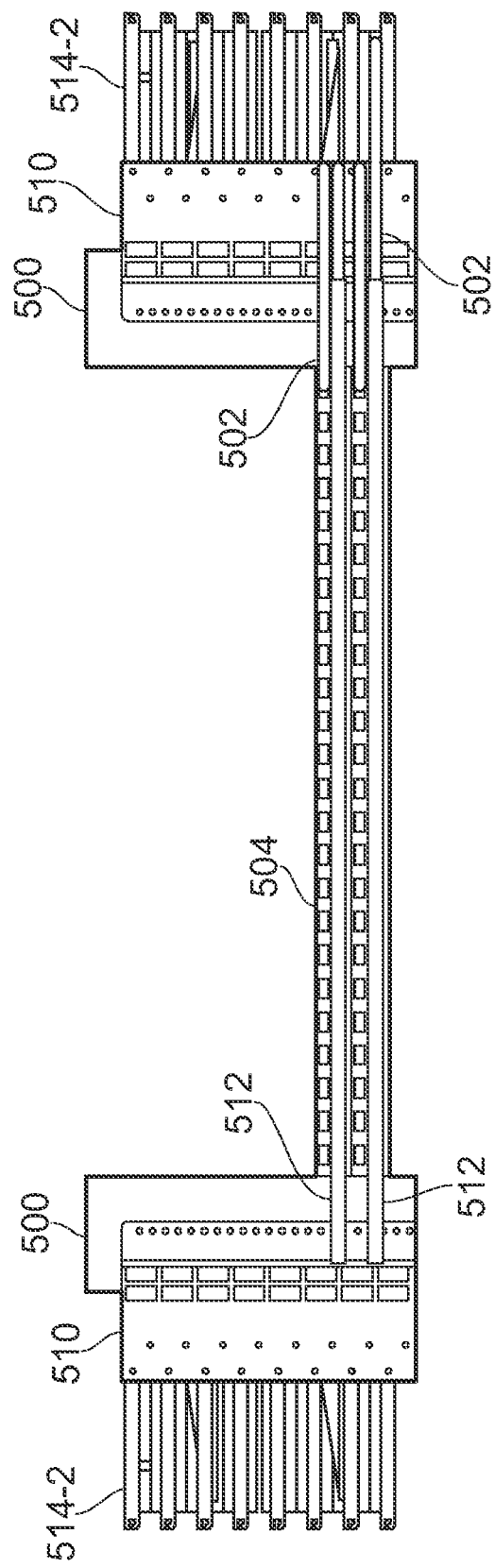
FIGS. 33 and 34 are schematic representations of example cable management structures.
Figure 34:
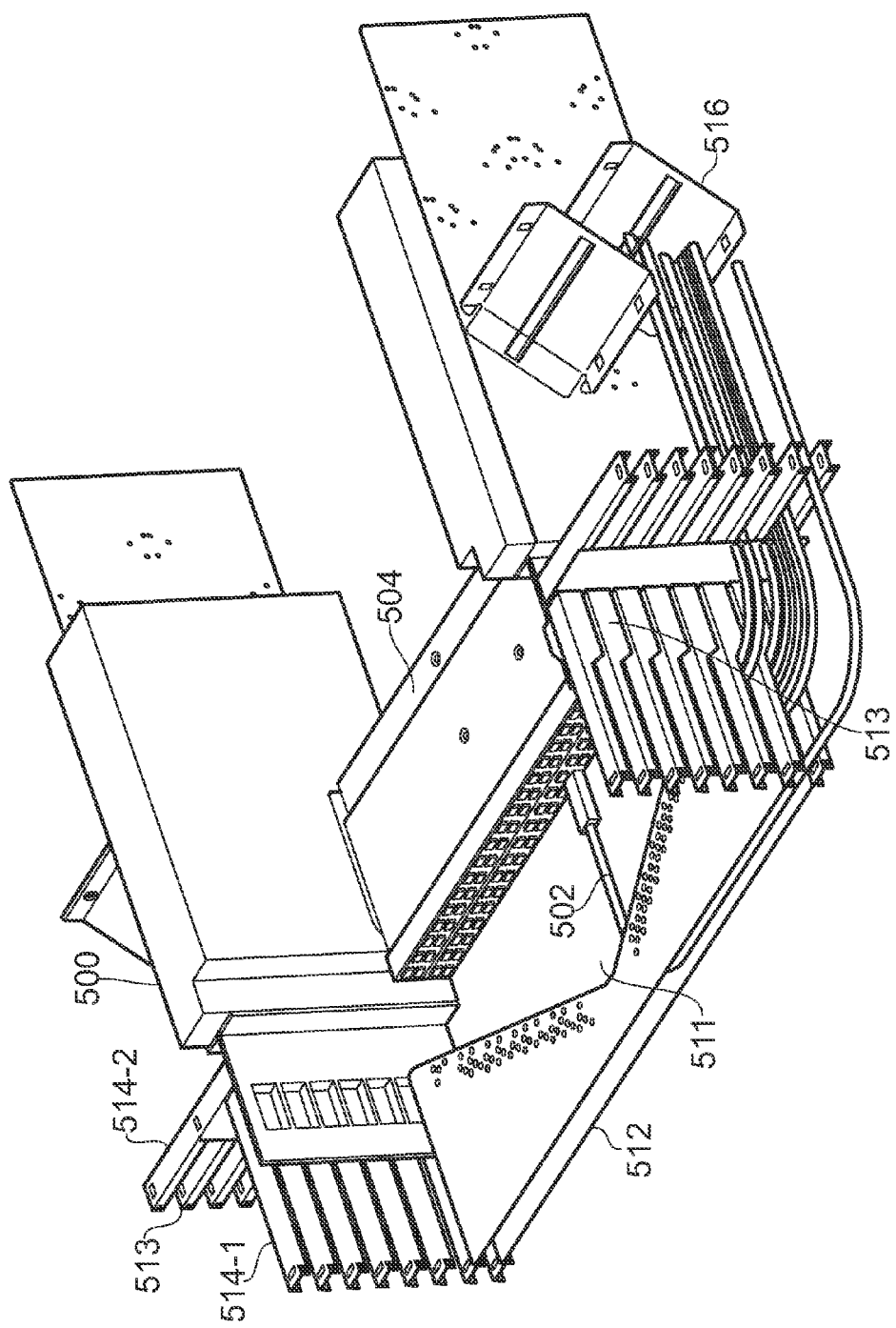
Figure 35:
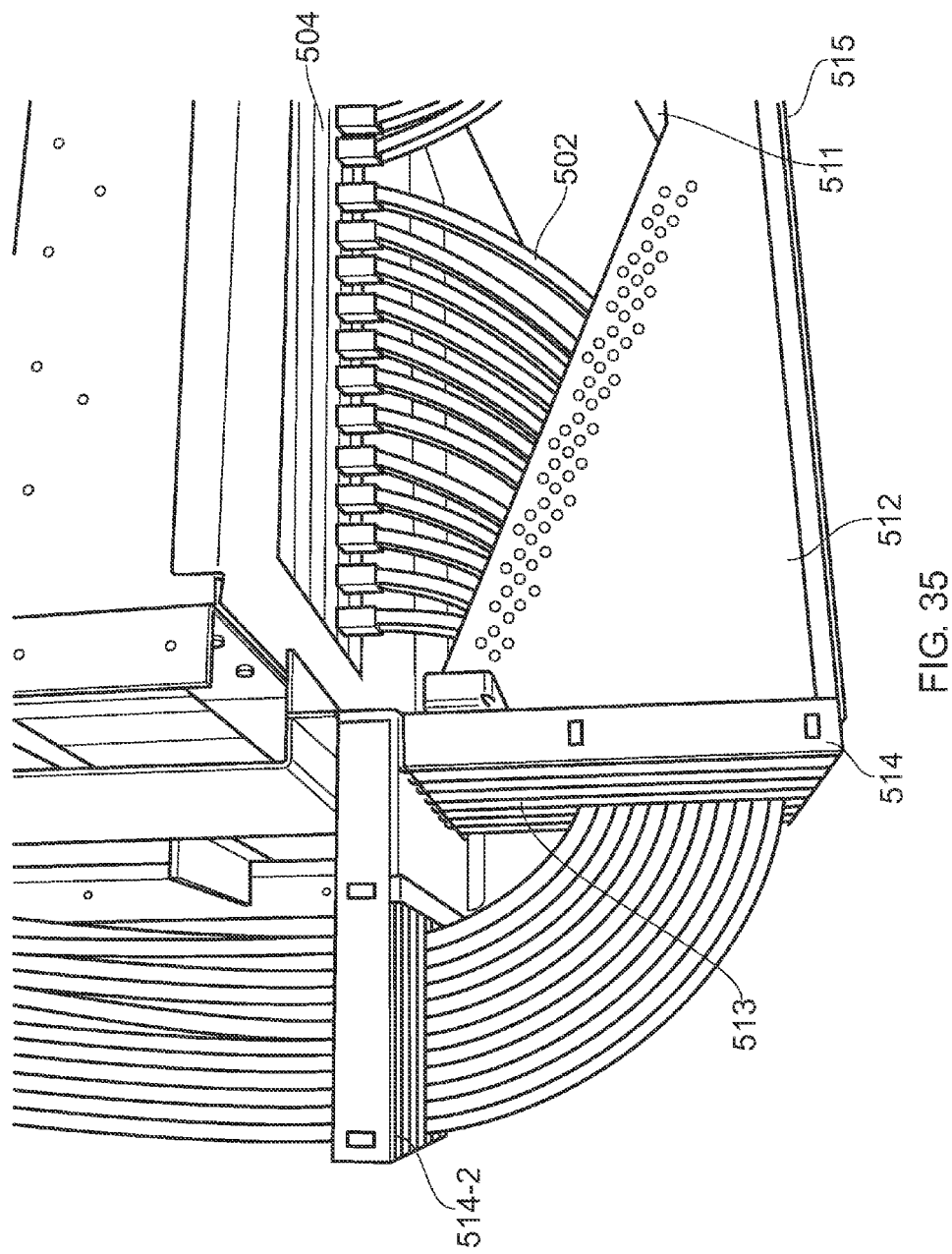
FIGS. 35-37 are further representations of details of the management structures shown schematically in FIGS. 33 and 34.
Figure 36:
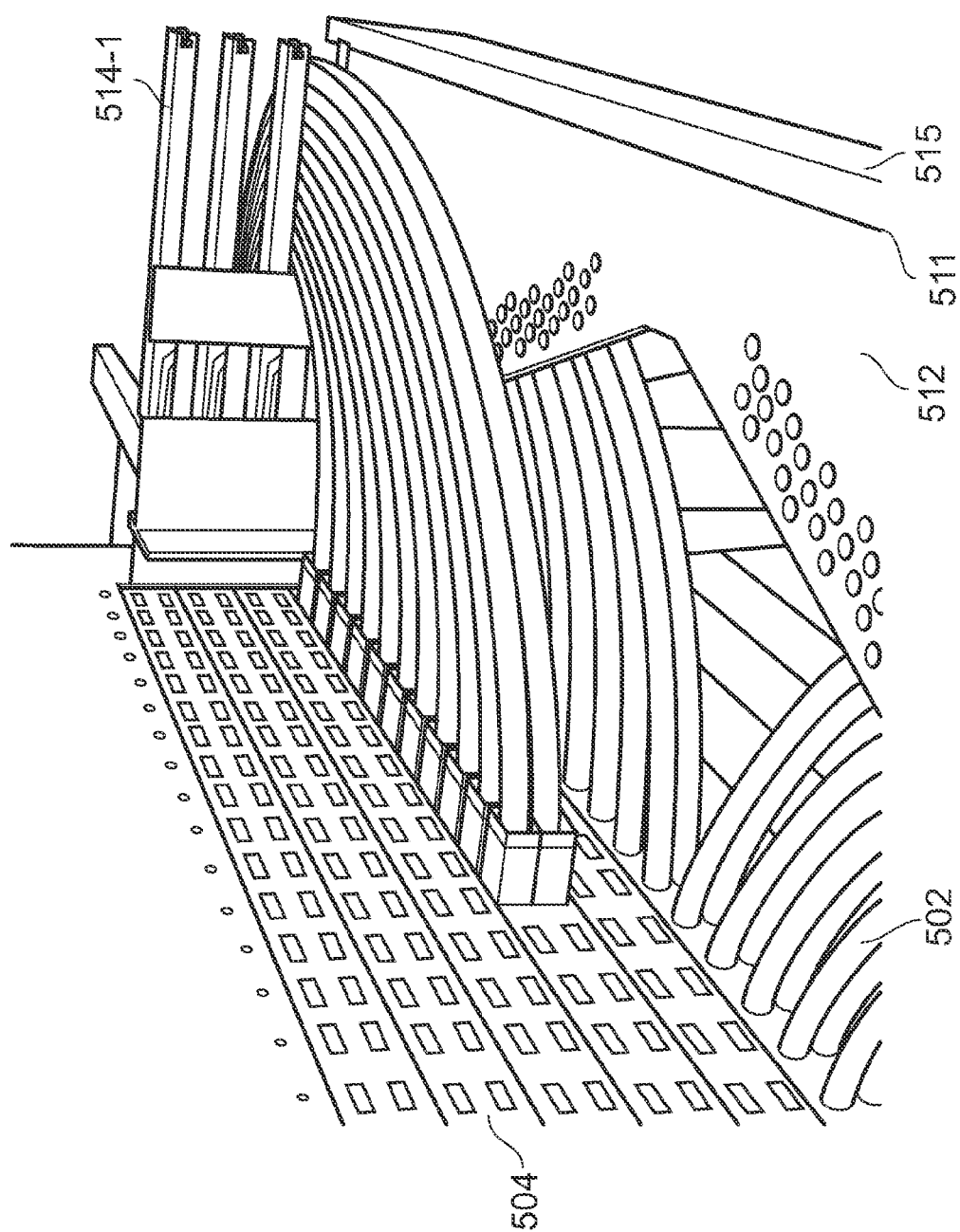
Figure 37:
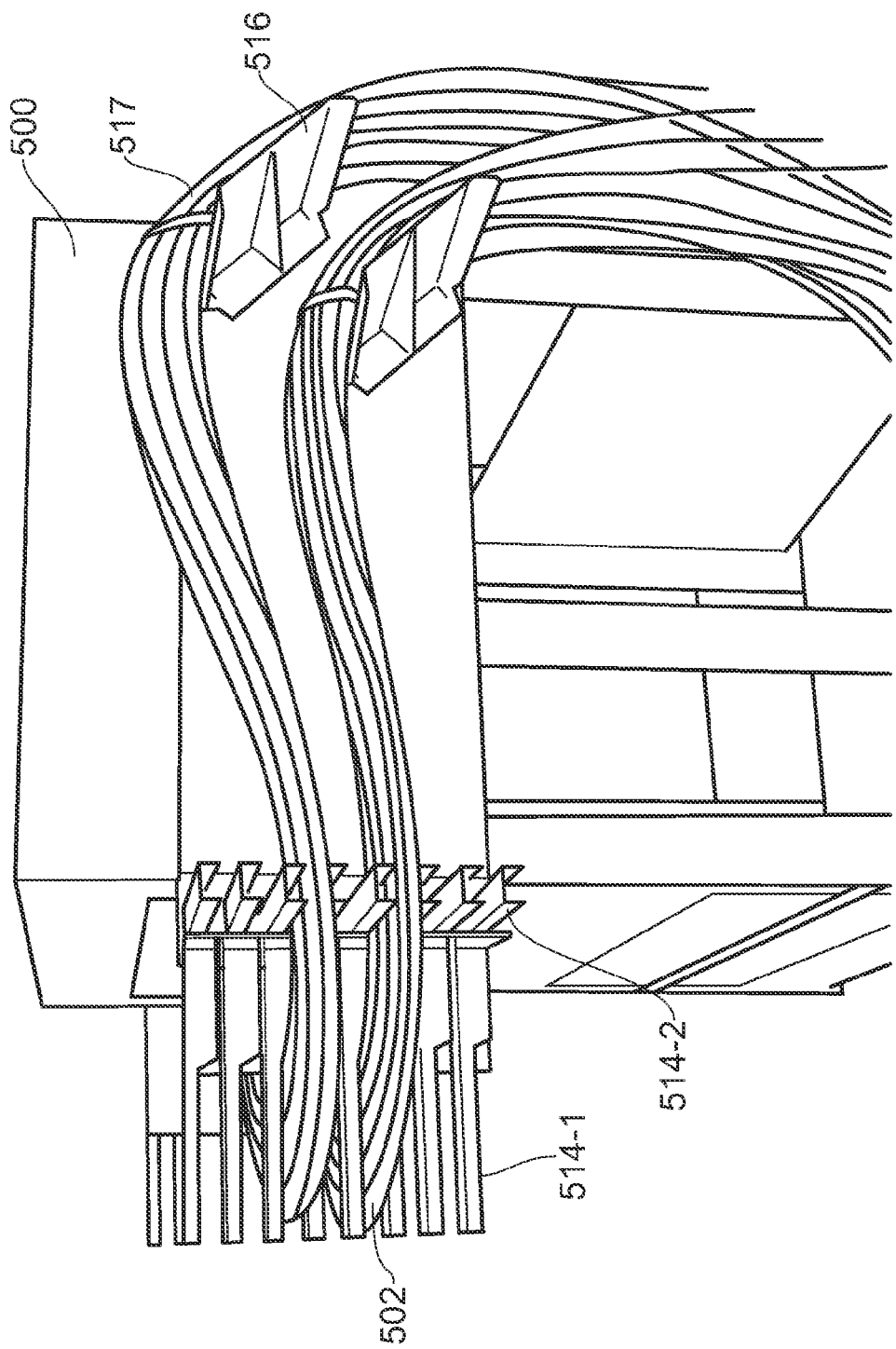
Figure 38:
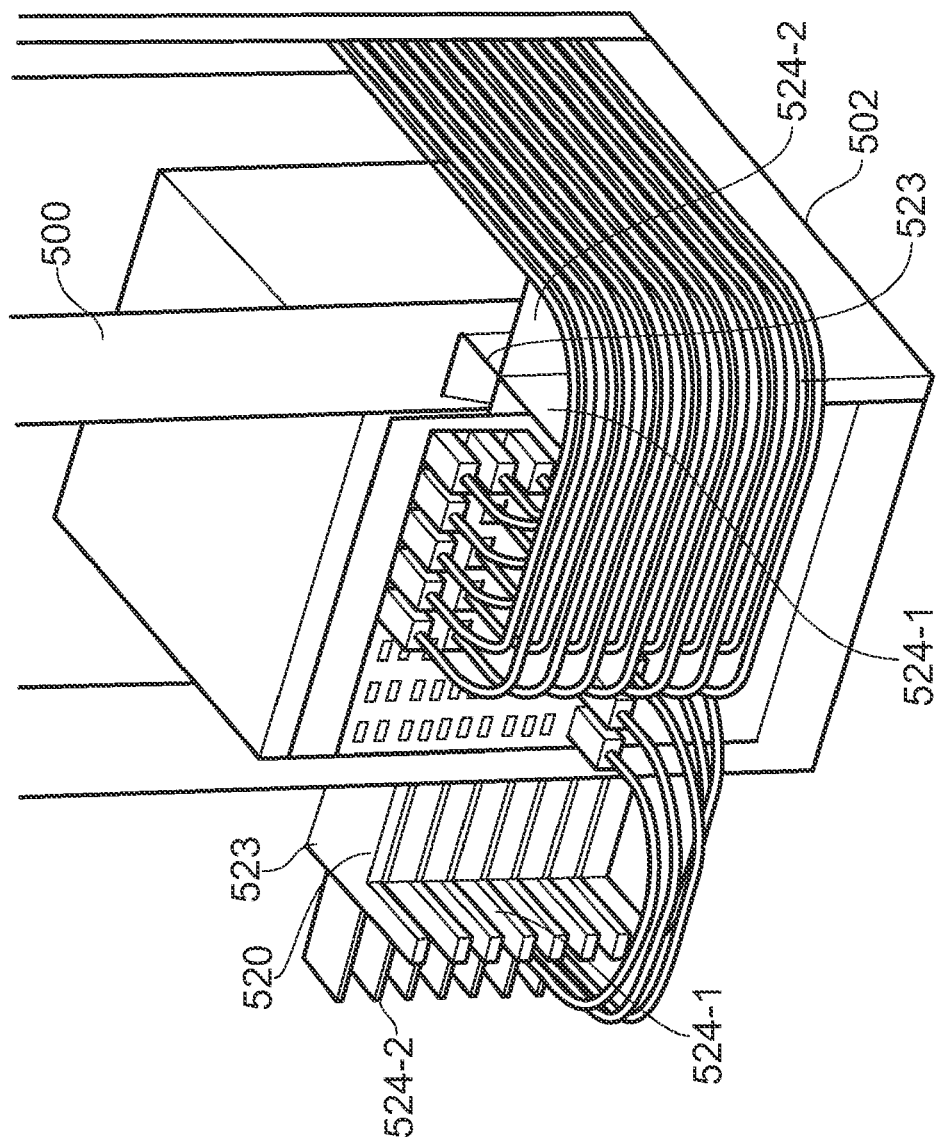
FIGS. 38 and 39 are schematic representations of an alternative example of cable management structures.
Figure 39:
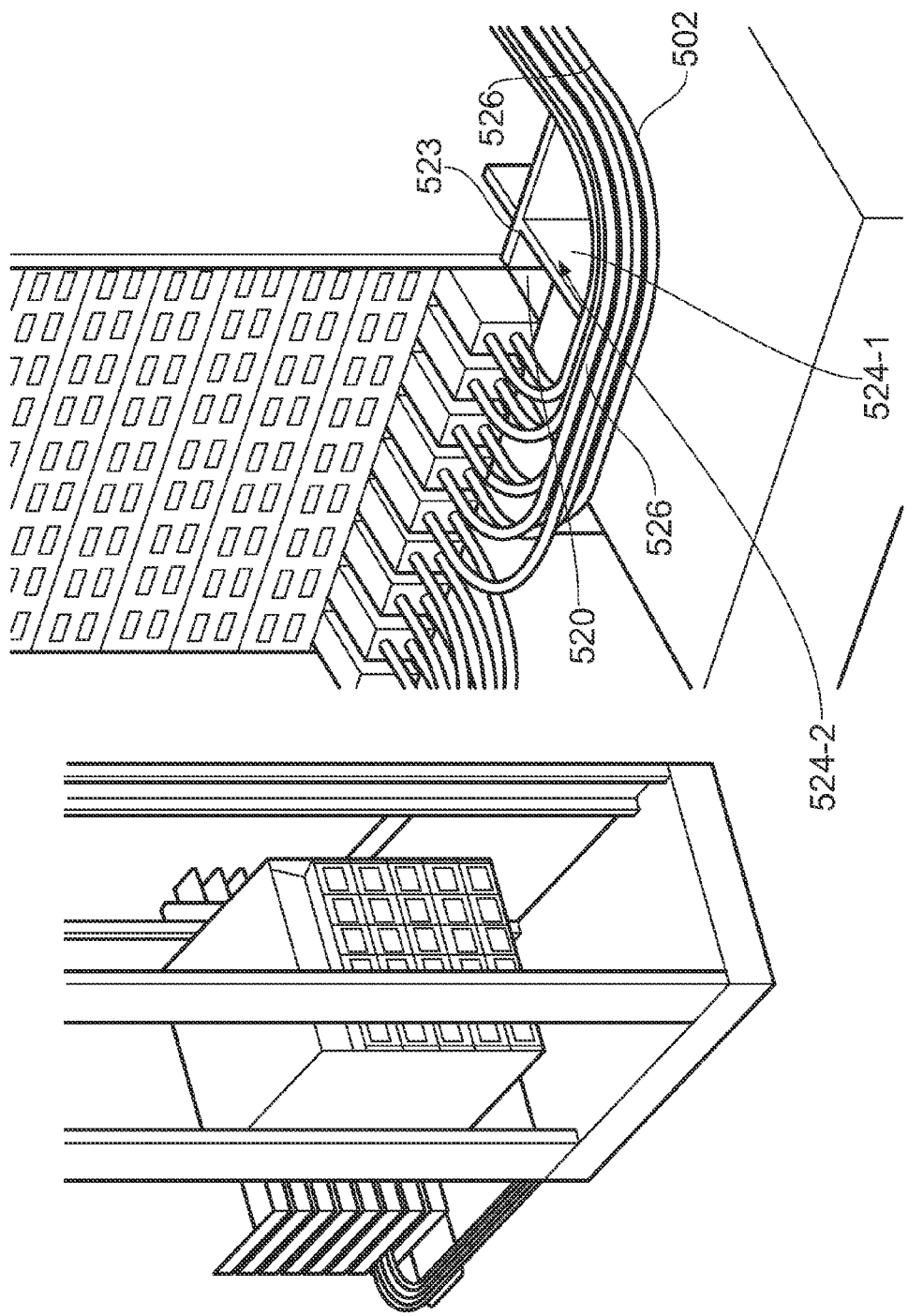

FIGS. 33 and 34 are schematic representations of example cable management structures 50. FIGS. 35-37 are further representations of details of the management structures 50 shown schematically in FIGS. 33 and 34. FIGS. 38 and 39 are schematic representations of an alternative example of cable management structures.

The example management structures illustrated schematically in FIGS. 33 and 34, and as also shown in FIGS. 35-37 correspond to the management structures 50 shown in FIGS. 5-11.

The cable management structures 50 comprise side support structures 510, for example made of a metal such as aluminum or steel, mounted to left and right sides of the switch chassis 500. Removable support shelves 512, for example made of a metal such as aluminum or steel, (or any other suitable materials, for example a plastics material) extend between the side support structures 510 and serve to support the weight of the cables 502 that extend from the line cards 504. The shelves are provided with an angled portion 515 (e.g., an upwardly angled or bent over portion) at an edge thereof that serves to provide a profile to resist deformation of the shelf without increasing the thickness of the main plane of the shelf. Although not provided with a reference sign in FIG. 7, this angled portion can also be seen, for example, at the left hand end of the shelves shown in FIG. 7.

In order to save weight and materials, while maintaining an appropriate support for the cables, the edge of the shelves 512 facing the switch chassis 500 can be tapered towards the middle thereof, as shown for example at 511 in FIG. 34 to 36. As a result, a shelf can be deeper front to back in a region where more weight needs to be carried (i.e. at the side edge of the shelf) than at a region where less weight needs to be carried (i.e. in the middle part of the shelf). The shelves can also be perforated to reduce weight and/or facilitate airflow.

In the example shown, pairs of cables 502 exit one over the other from each line card 504, the pairs of cables being supported by the shelf such that sufficient space is provided above the upper most cable and below the overlying shelf to allow cooling air for the line cards to pass. Spaces are also left between the cables to facilitate the passage of cooling air as can be seen, for example, in FIGS. 35-37. As is also seen in FIGS. 35-37, side structures 514 facilitate the supporting of the shelves 512 and the cables. The side structures extend out substantially horizontally to the front and to the sides and facilitate the adoption of a smooth curve for the cables to enable the cables to be guided to the sides of the chassis to form left and right cable bundles 517 for each line card on the left and right sides of the chassis. The cable bundles 517 then pass via elbow brackets 516 to form consolidated bundles for ceiling or floor exit. The cable management structures are configured to maintain at least a predetermined minimum bend radius for the cables.

If the face of the chassis in which the line cards 14 are mounted is called the front of the chassis, the cable support structures comprise forward facing cantilevered arms 514-1, and side facing cantilevered arms 514-2. In the example shown, there is one forward facing cantilevered arm 514-1, and one side facing cantilevered arms 514-2, for each of the left and right sides of a line card, when the line card is mounted in the switch chassis. At each of the left and right hand sides of the switch chassis, a cable support mount 513, for example a support plate, can be mounted to a side upright 519 of the switch chassis, for example using screws, clips, or other fastenings. The cantilevered arms 514-1 and 514-2 can then be mounted to the cable support mount 513 using, for example, screws, clips, or other fastenings. The removable support shelves 512 can then be removably mounted to the forward facing cantilevered arms 514-1, for example using screws, clips, or other fastenings, of for example by being slid into grooves (not shown) formed in the sides of the forward facing cantilevered arms 514-1.

FIGS. 38 and 39 illustrate an alternative construction for the cable management structures where removable cable management cross members 520, for example made of a metal such as aluminum or steel, are used rather than shelves. The removable cable management cross members 520 are supported by cable support brackets 524 that guide the cables to adopt at least a predetermined minimum bend radius. As in the example described with reference to FIGS. 33 to 37, if the face of the chassis in which the line cards 14 are mounted is called the front of the chassis, the example cable support structures shown in FIGS. 38 and 39 comprise forward facing cantilevered arms 524-1, and side facing cantilevered arms 524-2, with one forward facing cantilevered arm 524-1 and one side facing cantilevered arms 524-2, for each of the left and right sides of a line card. At each of the left and right hand sides of the switch chassis, a cable support mount 523, for example a support plate, can be mounted to a side upright 519 of the switch chassis, for example using screws, clips, or other fastenings. The cantilevered arms 524-1 and 524-2 can then be mounted to the cable support mount 523 using, for example, screws, clips, or other fastenings. The removable cable management cross members 520 can then be removably mounted to the forward facing cantilevered arms 524-1, for example using screws, clips, or other fastenings, of for example by being mounted in slots 525 formed in the forward facing cantilevered arms 524-1.

FIG. 39 also shows slots 526 formed in the cable support brackets 524-1 and 524-2 for locating the cables for facilitating the formation of bundles of cables.

In a particular example, the cable management structures are able to support and guide 1152 cables 502, for a switch chassis that can support 24 line cards 14 with 576 dual stack I/O connectors, and with each line card 14 having 24 dual stack I/O connectors 41. From a front view, each line card has 24 cables 502 exiting from each side (left and right) for a total of 48 cables 502. For each side, each 24-cable bundle 517 exiting the line card will maintain the proper bend radius per manufacturer's recommendation. At each cable guide bracket 516, the cable bundle can be secured with, for example Velcro straps. Each line card either has a cable support shelf 512 or another form of cable support cross member associated with it. The cable support shelf or cross member attaches to the left and right cable assembly structures. The cable support shelf or cross member provides cable weight support while exhibiting minimal deflection. In addition, the intake airflow path is minimally impacted. As the cable bundles exit toward the rear of the unit, the cable bundles are combined to form one bundle and directed at the proper elbow bracket 516 oriented for ceiling or floor exit. In one example, the cable management structures for each system that manages 1152 cables consist of three bracket assemblies per side (six in total). Each cable management bracket assembly supports eight line cards and is attached to the system.

Accordingly, there has been described a cable management system for a switch chassis configured to receive a plurality of line card units, where each line card unit includes at least one row of line connectors along a first edge of the line card unit, each line connector being configured to receive a cable connector of a cable. The cable management system comprises a cable guide arrangement for guiding each of a plurality of cables such that, when the respective cable connectors thereof are connected to the line connectors of the at least one row of line connectors, each of said plurality of cables from the at least one row of line connectors extend out from the line card unit and lie substantially within a plane.

The example embodiments described above can provide a cable management solution for a switch that has 1152 cables exiting the system. While maintaining the proper manufacturer's bend radius, good airflow can be provided, which permitting single line card extraction and cable trunk orientation (e.g., floor and/or ceiling exit).

Although the embodiments above have been described in considerable detail, numerous variations and modifications will become apparent to those skilled in the art once the above disclosure is fully appreciated.

What is claimed is:

1. A cable management system for a switch chassis configured to receive a plurality of line card units, each line card unit including at least one row of line connectors along a first edge of the line card unit, each line connector being configured to receive a cable connector of a cable, the cable management system comprising a cable guide arrangement configured to guide each of a plurality of cables such that, when the respective cable connectors thereof are connected to the line connectors of the at least one row of line connectors, the cables extend out from the first edge of the line card unit and then curve back, whereby the cables can pass at least part way along at least one side of the line card unit, the cable guide arrangement being configured such that said plurality of cables lie substantially within a plane parallel to said at least one row of line connectors as the cables extend out from the first edge and curve back, wherein the cable management system extends outside the switch, chassis, and wherein the cable management system comprises at least one structure that extends from the chassis and that is configured to support the cables so that the cables maintain at least a predetermined minimum bend radius, wherein the first edge of the line card unit is one front or rear of the line card unit, and wherein the cable guide arrangement is configured to guide each of a plurality of cables, when the respective cable connectors thereof are connected to the line connectors of the at least one row of line connectors, such that said plurality of cables lie substantially within a plane parallel to said at least one row of line connectors to the front of the line card unit if the first edge of the line card unit is the front of the line card unit, and to the rear of the line card unit if the first edge of the line card unit is the rear of the line card unit.

2. The cable management system of claim 1, comprising a cable support shelf associated with a line card unit, the cable support shelf providing cable weight support.

3. The cable management system of claim 2, wherein the cable support shelf is configured to provide cable weight support while exhibiting minimal deflection.

4. The cable management system of claim 3, wherein the cable support shelf is provided with a profile to resist deflection.

5. The cable management system of claim 2, wherein the cable support shelf configured to permit airflow path for the line card unit.

6. The cable management system of claim 1, configured to form cable bundles from a group of cables for a line card.

7. The cable management system of claim 6, configured to combine cable bundles from a respective line card to form a consolidated cable bundle, and comprising an elbow bracket oriented for ceiling or floor exit.

8. The cable management system of claim 7, wherein after extending out from the first edge of the line card unit and until at least one of the ceiling and the floor exit, the cables remain outside the line card unit and the chassis.

9. A switch comprising a switch chassis and a cable management system, the cable management system being configured to receive a plurality of line card units, each line card unit including at least one row of line connectors along a first edge of the line card unit, each line connector being configured to receive a cable connector of a cable, the cable management system comprising a cable guide arrangement configured to guide each of a plurality of cables such that, when the respective cable connectors thereof are connected to the line connectors of the at least one row of line connectors, the cables extend out from the first edge of the line card unit and then curve back, whereby the cables can pass at least part way along at least one side of the line card unit, the cable guide arrangement being configured such that said plurality of cables lie substantially within a plane parallel to said at least one row of line connectors as the cables extend out from the first edge and curve back, wherein the first edge of the line card unit is one front or rear of the line card unit, and wherein the cable guide arrangement is configured to guide each of a plurality of cables, when the respective cable connectors thereof are connected to the line connectors of the at least one row of line connectors, such that said plurality of cables lie substantially within a plane parallel to said at least one row of line connectors to the front of the line card unit if the first edge of the line card unit is the front of the line card unit, and to the rear of the line card unit if the first edge of the line card unit is the rear of the line card unit;

wherein the cable management system extends outside the switch chassis, and wherein the cable management system comprises at least one structure that extends from the chassis and that is configured to support the cables so that the cables maintain at least a predetermined minimum bend radius.

10. The switch of claim 9, comprising a plurality of line card units mounted in the switch chassis.

11. The switch of claim 10, further comprising a plurality of fabric cards mounted in the switch chassis, the fabric cards being oriented substantially orthogonally to the line cards and being electrically connected thereto via a midplane.

12. A cable management system for a switch chassis configured to receive a plurality of line card units, each line card unit including at least one row of line connectors along a first edge of the line card unit, each line connector being configured to receive a cable connector of a cable, the cable management system comprising a cable guide means for guiding each of a plurality of cables such that, when the respective cable connectors thereof are connected to the line connectors of the at least one row of line connectors, each of said plurality of cables from the at least one row of line connectors extend out from the line card unit and lie substantially within a plane, wherein the cable management system extends outside the switch chassis, and wherein the cable management system comprises at least one structure that extends from the chassis and that is configured to support the cables so that the cables maintain at least a predetermined minimum bend radius;

wherein the first edge of the line card unit is one front or rear of the line card unit, and wherein the cable guide arrangement is configured to guide each of a plurality of cables, when the respective cable connectors thereof are connected to the line connectors of the at least one row of line connectors, such that said plurality of cables lie substantially within a plane parallel to said at least one row of line connectors to the front of the line card unit if the first edge of the line card unit is the front of the line card unit, and to the rear of the line card unit if the first edge of the line card unit is the rear of the line card unit.

13. The cable management system of claim 1, wherein after extending out from the first edge of the line card unit, the cables do not re-enter the chassis.

14. The cable management system of claim 1, wherein after extending out from the first edge of the line card unit, the cables remain outside the line card unit.

15. The cable management system of claim 1, wherein after extending out from the first edge of the line card unit, the cables remain outside the line card unit and the chassis.

\* \* \* \* \*